US008200087B2

(12) United States Patent
Boffi et al.

(10) Patent No.: US 8,200,087 B2
(45) Date of Patent: Jun. 12, 2012

(54) METHOD AND DEVICE FOR STABILIZING THE STATE OF POLARIZATION OF A POLARIZATION MULTIPLEXED OPTICAL RADIATION

(75) Inventors: Pierpaolo Boffi, Voghera (IT); Lucia Marazzi, Pavia (IT); Paolo Martelli, Milan (IT); Mario Martinelli, San Donato Milanese (IT); Aldo Righetti, Milan (IT); Rocco Siano, Milan (IT)

(73) Assignee: Google Inc., Mountain View, CA (US)

( * ) Notice: Subject to any disclaimer, the term of this patent is extended or adjusted under 35 U.S.C. 154(b) by 0 days.

(21) Appl. No.: 13/038,990

(22) Filed: Mar. 2, 2011

(65) Prior Publication Data
US 2011/0170870 A1 Jul. 14, 2011

Related U.S. Application Data

(63) Continuation of application No. 11/665,466, filed as application No. PCT/EP2004/011957 on Oct. 22, 2004, now Pat. No. 7,917,031.

(51) Int. Cl.
*H04J 14/06* (2006.01)
(52) U.S. Cl. .................. 398/65; 398/81; 398/93
(58) Field of Classification Search .......... 398/65, 398/68, 81, 93
See application file for complete search history.

(56) References Cited

U.S. PATENT DOCUMENTS

| 6,130,766 | A | 10/2000 | Cao | |
|---|---|---|---|---|
| 6,707,541 | B1 * | 3/2004 | Noe | .............. 356/73.1 |
| 7,917,031 | B2 * | 3/2011 | Boffi et al. | .............. 398/65 |
| 2002/0118456 | A1 * | 8/2002 | Hasman et al. | ........... 359/484 |
| 2002/0191265 | A1 | 12/2002 | LaGasse et al. | |
| 2003/0128982 | A1 | 7/2003 | Glingener | |
| 2003/0202798 | A1 | 10/2003 | Chou et al. | |
| 2004/0016874 | A1 * | 1/2004 | Rao et al. | .............. 250/225 |
| 2007/0110451 | A1 | 5/2007 | Rasmussen et al. | |
| 2007/0140701 | A1 | 6/2007 | Riposati | |

FOREIGN PATENT DOCUMENTS

| FR | 2 795 184 | 12/2000 |
|---|---|---|
| WO | WO-02/07360 A1 | 1/2002 |
| WO | WO-03/014811 A1 | 2/2003 |

OTHER PUBLICATIONS

International Search Report mailed Sep. 26, 2005 for PCT/EP2004/011957, 3 pages.

* cited by examiner

*Primary Examiner* — Dzung Tran
(74) *Attorney, Agent, or Firm* — Honigman Miller Schwartz and Cohn LLP

(57) ABSTRACT

A device and method for stabilizing the state of polarization of polarization multiplexed optical radiation including an identified channel is disclosed. The device and method comprise providing to the polarization multiplexed optical radiation a first controllable polarization transformation to generate a first transformed optical radiation; detecting a first state of polarization of a first polarized portion with respect to a first polarization parameter; controlling the first controllable polarization transformation so that the first polarization parameter has a predetermined value independent of a polarization state of the polarization multiplexed optical radiation; providing to the first transformed optical radiation a second controllable polarization transformation to generate a second transformed optical radiation; detecting a second state of polarization of a second polarized portion; and controlling the second controllable polarization transformation so that the second state of polarization has a predefined value.

24 Claims, 13 Drawing Sheets

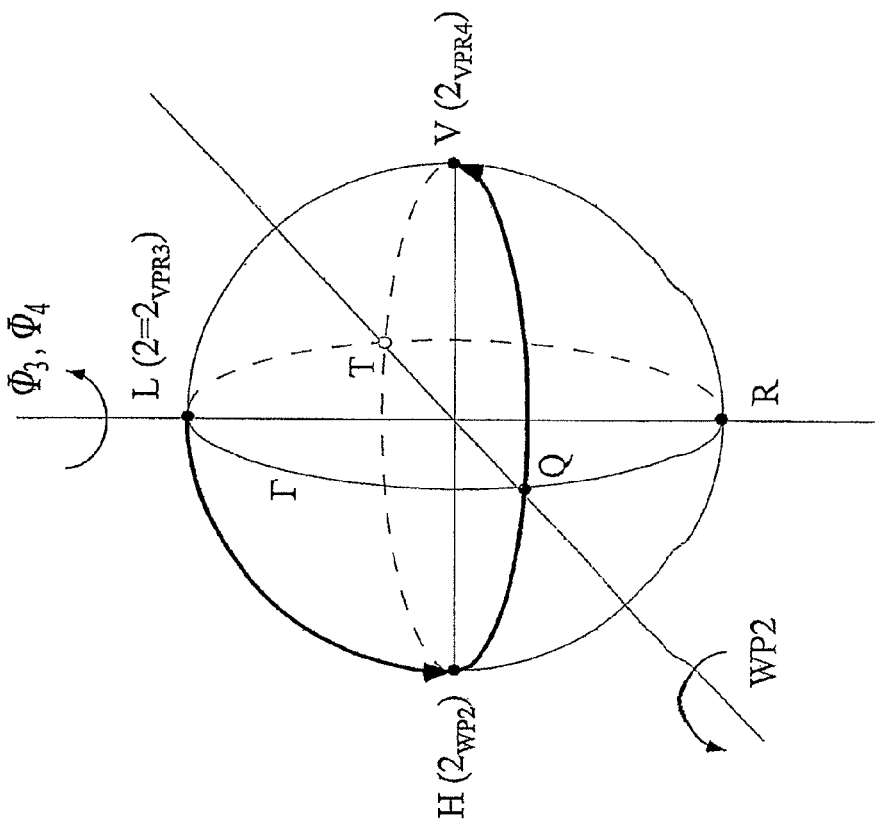
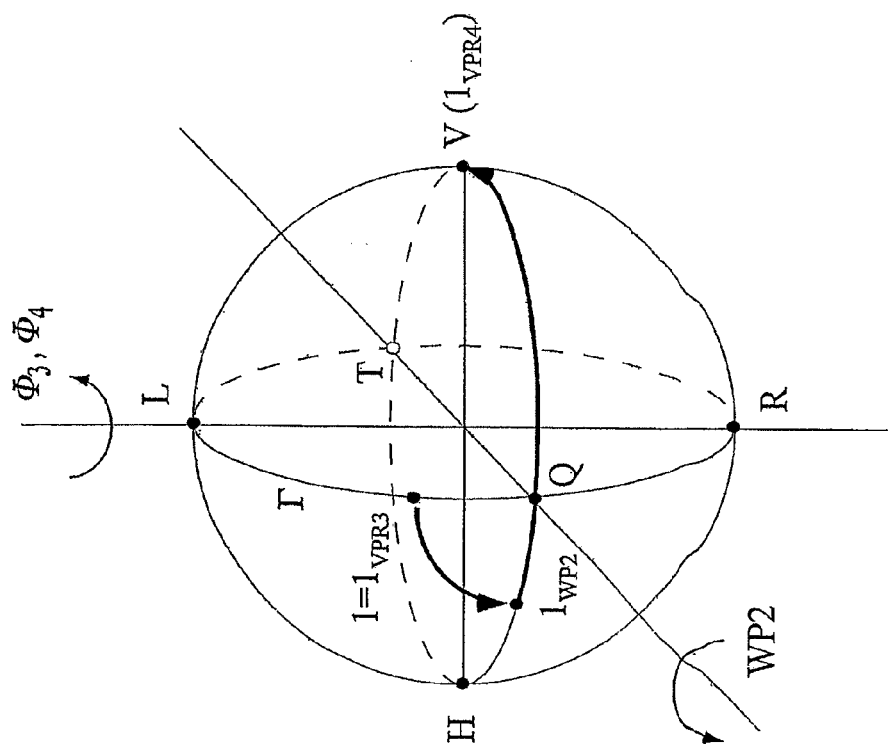
Fig. 6b
Fig. 6a

METHOD AND DEVICE FOR STABILIZING THE STATE OF POLARIZATION OF A POLARIZATION MULTIPLEXED OPTICAL RADIATION

CROSS REFERENCE TO RELATED APPLICATIONS

This application is a continuation of U.S. application Ser. No. 11/665,466, filed on Apr. 16, 2007 now U.S. Pat. No. 7,917,031, which is a national phase application based on PCT/EP2004/011957, filed on Oct. 22, 2004, the contents of each of which are incorporated herein by reference in their entirety.

BACKGROUND OF THE INVENTION

1. Field of the Invention

The invention relates to polarization stabilization, more especially to methods and devices for stabilizing with a high accuracy the polarization state of an optical radiation of arbitrary, possibly time variant, polarization.

2. Description of the Related Art

A polarization stabilizer is a device that transforms an input optical beam having an input state of polarization (SOP) into an output optical beam with a predetermined SOP and an optical power, both not dependent on the input SOP. In general, a defined SOP is determined by two parameters: the ellipticity and the polarization azimuth. Such a device is useful, for example, in coherent optical receivers for matching the SOP between the signal and the local oscillator, in fiber optic interferometric sensors, in compensation of polarization mode dispersion of the transmission line and in optical systems with polarization sensitive components. An important requirement is the endlessness in control, meaning that the stabilizer must compensate in a continuous way for the variations of input SOP.

In polarization division multiplexing (PolDM) transmission at least two optical channels, each comprising an optical carrier, are launched orthogonally polarized in the optical transmission medium, such as for example an optical transmission fiber. In a typical solution for PolDM transmission, the two optical carriers of the at least two orthogonally polarized optical channels are spectrally closely spaced, such as for example within an optical spectrum spacing of 50 GHz or within a 25 GHz spacing. In a preferred configuration, the two carriers, and hence the two channels, have substantially the same optical wavelength. Typically, while the reciprocal orthogonality of the state of polarization is substantially preserved along the propagation into the transmitting medium, the absolute SOPs of the two channels randomly fluctuate at a given position along the line, such as for example at the receiver section.

In PolDM, a problem arises at the receiving section, or whenever the two orthogonally polarized channels need to be polarization demultiplexed. In general, the polarization demultiplexer is typically a polarization beam splitter, which is apt to split two orthogonal SOPs. In case of an error in polarization locking, a misalignment occurs between the SOPs of the two channels and the orthogonal SOPs divided by the polarization demultiplexer. In this case a cross-talk is generated due to an interference between a desired channel and the small portion of the other non-extinguished channel, which severely degrades the quality of the received signal. For example, in PolDM systems having the individual channels intensity modulated with non-return-to-zero format and directly-detected (IM-DD), the penalty to the bit-error-rate becomes about 1 dB for cross-talk of about 20 dB. This means that in case the intensity of the non-extinguished channel is greater than or equal to about 1% of the intensity of the demultiplexed channel, the cross-talk becomes a concern.

Accordingly, in PolDM systems a highly accurate polarization stabilization of the SOPs of the two polarization multiplexed channels is needed before polarization demultiplexing. The cross-talk after polarization demultiplexing is related to the accuracy of polarization stabilization. In case of a single optical channel, the accuracy of a polarization stabilizer in terms of optical power may be expressed through a parameter, called uniformity error, defined according to $$U = \frac{I_{max} - I_{min}}{I_{max} + I_{min}}, \qquad (1)$$

wherein $I_{max}$ and $I_{min}$ are the actual maximum and minimum optical intensities, in locked operation, of the polarization-stabilized output radiation of the channel when varying the input SOP. In general, the smaller is the uniformity error, the smaller results the cross-talk after demultiplexing. For example, under simplified conditions, a uniformity error of about 1% gives rise to a cross-talk of about 2%. The patent application US2004/0016874 discloses (see FIG. 4 thereof) an automatic polarization controller for a polarization multiplexed optical pulse train including at least one dither modulation signal, the polarization controller including a polarization transformer of any type. A polarization selective element receives the transformed polarization multiplexed optical pulse train and passes a polarized optical pulse train including the dither modulation signal. A detector receives the polarized optical pulse train including the dither modulation signal and generates a signal that is proportional to the amplitude of the dither modulation signal. A feedback control unit generates a control signal that is coupled to the control input of the polarization transformer.

The patent application US2002/0191265 discloses (see FIG. 3 thereof) a two-stage electro-optic polarization transformer for transforming the polarization states of an orthogonally polarized polarization multiplexed optical signal comprising a first and a second component. An optical feedback signal is extracted from the output of the second stage polarization transformer. In one embodiment, the first and the second components of the polarization multiplexed optical signal are identified with different dither frequencies. A mixer generates a signal that has a frequency that identifies the component of the polarization multiplexed optical signal.

The Applicant has noted that the polarization controllers disclosed in both the documents above directly detect the SOP of the optical radiation only downstream the polarization transformer itself (only downstream the second stage in the second document) and send a single feed-back signal to the feedback control unit. The methods disclosed thus require complicate elaboration of the electrical feedback signal and complicate control algorithm, without adding in precision to the polarization stabilization.

WO03/014811 patent discloses an endless polarization stabilizer based on a two-stage configuration wherein the two stages are controlled independently by an endless polarization stabilizing method based on a simple feedback control algorithm. Each stage comprises a pair of birefringent components that each have fixed eigenaxes and variable phase retardation. The two birefringent components are variable retarders with finite birefringence range and respective eigenaxes oriented at approximately ±45 degrees relative to each other. The endlessness is obtained by commuting the phase retardation of one retarder, when the retardation of the other retarder reaches a range limit.

SUMMARY OF THE INVENTION

The Applicant has found that none of the known solutions for polarization stabilization is at the same time suitable for working with a polarization multiplexed optical radiation, accurate enough to meet the specifications in the context of PolDM demultiplexing and simple enough to be practically feasible and operable. The Applicant has thus faced the problem of providing a simple, feasible and highly accurate method and device to stabilize the state of polarization of a polarization multiplexed optical radiation having an arbitrary SOP to a predetermined output SOP, while keeping the output optical power not dependent on the input SOP. In particular, the Applicant has sought an accuracy suitable for polarization demultiplexing applications in PolDM systems; for example the uniformity error is preferably less than or equal to 1%.

The Applicant has found that in the context of PolDM systems, in order to achieve highly accurate stabilization of the SOP, it is advantageous to achieve first an highly accurate stabilization of one out of the two polarization parameters (ellipticity and azimuth) and after that a highly accurate full stabilization of the SOP.

The Applicant has found that a method and a device based on two stages each comprising a respective variable birefringent element, independently controlled by a respective simple and effective feedback control algorithm, wherein the SOP of the optical radiation outputting from the first stage is directly detected through a monitoring system which is sensitive to a pilot signal contained in the optical radiation, provides polarization stabilization of a polarization multiplexed optical radiation with the degree of accuracy needed for polarization demultiplexing in PolDM systems and the feasibility and operability needed for industrial application. The Applicant has sought in particular a method and device for endlessly stabilize the polarization of a polarization multiplexed optical radiation.

In some polarization control schemes based on finite range components, in order to achieve an endless control, it has been proposed a reset procedure when a component reaches its range limit, designed so that the output SOP does not change during the reset. Generally, reset procedures can be problematic in that they are often associated with complex control algorithms designed to avoid loss of feedback control during the reset.

The Applicant believes that a polarization stabilizing method and device according to the above, wherein each stage comprises two variable retarders, in combination with a simple and effective control algorithm, which avoids reset procedure and is based on the commutation of the first retarder when the second reaches a retardation range limit, provides the speed, the degree of accuracy and the feasibility needed for polarization demultiplexing in PolDM systems.

The Applicant has found that a polarization stabilizer device wherein the variable retarders are variable rotators and each stage also comprises a fixed quarter-wave plate between them, adds further accuracy and feasibility to polarization stabilization of a polarization multiplexed radiation.

In a first aspect, the present invention relates to a method for stabilizing the state of polarization of a polarization multiplexed optical radiation comprising an identified channel which is provided with a pilot signal, the method comprising: providing to the polarization multiplexed optical radiation a first controllable polarization transformation to generate a first transformed optical radiation; measuring a first optical power of a first polarized portion of said identified channel of the first transformed optical radiation; controlling, responsively to said first optical power, the first controllable polarization transformation so that the identified channel of the first transformed optical radiation has a predefined polarization azimuth; providing to the first transformed optical radiation a second controllable polarization transformation to generate a second transformed optical radiation; measuring a second optical power of a second polarized portion of said identified channel of the second transformed optical radiation; controlling, responsively to said second optical power, the second controllable polarization transformation so that the identified channel of the second transformed optical radiation has a predefined state of polarization.

Preferably, said first polarized portion of said identified channel of the first transformed optical radiation has the polarization azimuth at ±45° with respect to said predefined polarization azimuth. Advantageously, said second polarized portion of said identified channel of the second transformed optical radiation has the state of polarization parallel or perpendicular to said predefined state of polarization.

Preferably, the first optical power of the first polarized portion of said identified channel of the first transformed optical radiation is measured through measuring a modulation amplitude of said pilot signal. More preferably, said modulation amplitude is measured after extracting a power fraction from the first transformed optical radiation, polarizing said power fraction to generate a polarized power fraction, detecting said polarized power fraction and pass-band filtering said detected polarized power fraction to obtain said modulation amplitude.

Advantageously, also the second optical power of the second polarized portion of said identified channel of the second transformed optical radiation is measured through measuring a modulation amplitude of said pilot signal.

In order to measure said modulation amplitude, it is preferable to extract a power fraction from the second transformed optical radiation, polarize said power fraction to generate a polarized power fraction, detect said polarized power fraction and pass-band filter said detected polarized power fraction to obtain said modulation amplitude.

The method according to the present invention may further comprise measuring a third optical power of a third polarized portion of said identified channel of the first transformed optical radiation. Preferably, said third polarized portion of said identified channel of the first transformed optical radiation has the polarization azimuth orthogonal to the polarization azimuth of said first polarized portion.

In a further preferred embodiment, the first controllable polarization transformation is endlessly varying. Also the second controllable polarization transformation may be endlessly varying.

In a second aspect of the present invention, it is disclosed a method of demultiplexing a polarization multiplexed optical radiation, the method comprising any method described above and further comprising separating the identified channel in the second transformed optical radiation from a further channel orthogonally polarized to the identified channel.

In a third aspect, the present invention is a method of transmitting a polarization multiplexed optical signal, the method comprising: providing a pilot signal to an optical channel to generate an identified channel; polarization multiplexing the identified channel with a further channel at a first location to generate a polarization multiplexed optical radiation; propagating said polarization multiplexed optical radiation at a second location different from the first location;

stabilizing the state of polarization of the polarization multiplexed optical radiation at the second location according to any of the method described above to generate a polarization stabilized optical radiation; separating the identified channel of the polarization stabilized optical radiation from the further channel and detecting at least one of said identified and further channel.

In a fourth aspect, the invention relates to a device for stabilizing the state of polarization of a polarization multiplexed optical radiation comprising an identified channel which is provided with a pilot signal, the device comprising a first polarization transformer comprising a first birefringent element operable to provide a first variable polarization transformation to the polarization multiplexed optical radiation; a first monitoring system responsive to said pilot signal and apt to measure the optical power of a first polarized portion of the identified channel downstream the first polarization transformer; a controller apt to control, responsively to the optical power of said first polarized portion, said first variable polarization transformation so as to maintain the polarization azimuth of the identified channel downstream the first polarization transformer at a predefined azimuth; a second polarization transformer positioned downstream the first polarization transformer and comprising a second birefringent element operable to provide a second variable polarization transformation to the polarization multiplexed optical radiation; a second monitoring system responsive to said pilot signal and apt to measure the optical power of a second polarized portion of the identified channel downstream the second polarization transformer; and wherein the controller is further apt to control, responsively to the optical power of said second polarized portion, said second variable polarization transformation so as to maintain the state of polarization of the identified channel downstream the second polarization transformer at a defined state of polarization.

Preferably, the first monitoring system is further apt to measure the optical power of a further polarized portion of the identified channel downstream the first polarization transformer, wherein said further polarized portion is orthogonal to the first polarized portion.

The first polarization transformer may further comprise a third birefringent element operable to provide a third variable polarization transformation to the polarization multiplexed optical radiation. In this case, it is preferable that the controller is configured to switch the third variable polarization transformation between first and second values when the first variable polarization transformation reaches a predefined threshold value, in order to provide a reset-free endless control. Preferably, each of the first birefringent element and the third birefringent element comprises a respective variable rotator and the first polarization transformer further comprises a quarter-wave plate optically interposed between the first and the third birefringent element.

The second polarization transformer may further comprise a fourth birefringent element operable to provide a fourth variable polarization transformation to the polarization multiplexed optical radiation. In this case, the controller is configured to switch the fourth variable polarization transformation between third and fourth values when the second variable polarization transformation reaches a predefined threshold value in order to provide a reset-free endless control.

Advantageously, the first monitoring system is configured to measure a modulation amplitude of said pilot signal so as to measure said optical power of said first polarized portion. Preferably, the first monitoring system comprises a splitter for extracting a power portion of said polarization multiplexed optical radiation, a polarization splitter for extracting a polarized portion of said power portion, a photodiode for generating a signal from said polarized portion of said power portion and a demodulator for band-pass filtering said signal to obtain said modulation amplitude of said pilot signal.

In a fifth aspect, the invention relates to an optical polarization demultiplexer comprising the polarization stabilizing device described above and a polarization division demultiplexer, such as e.g. a polarization beam splitter, located downstream the polarization stabilizing device and oriented parallel or perpendicular to said defined state of polarization.

In a sixth aspect, the invention relates to a polarization division multiplexing system comprising a polarization transmitter apt to combine a first and a second optical channel having orthogonal polarization, wherein the first channel comprises a pilot signal; a transmission line apt to transmit said combined first and second optical channel; and an optical polarization demultiplexer describe above, optically coupled to said transmission line, and apt to separate said first and second optical channel.

BRIEF DESCRIPTION OF THE DRAWINGS

For a better understanding of the invention and to show how the same may be carried into effect reference is now made by way of example to the accompanying drawings.

DETAILED DESCRIPTION OF THE INVENTION

Figure 1:
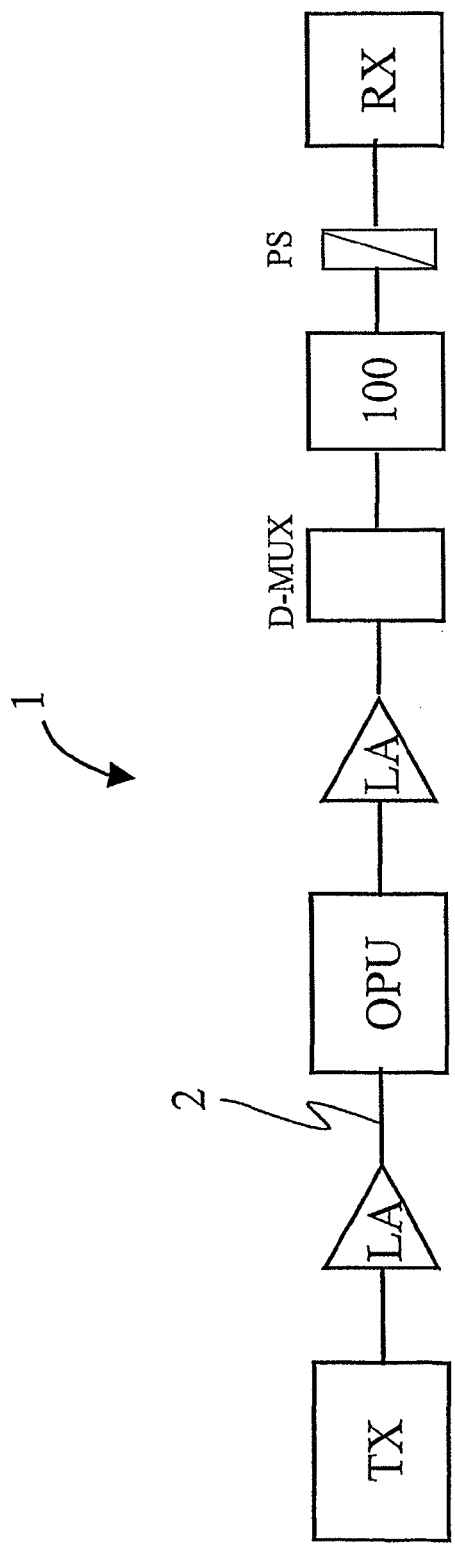
FIG. 1. Schematic drawing of a polarization division multiplexing optical system according to one aspect of the present invention.

FIG. 1 schematically shows a polarization division multiplexing system 1 in accordance with one aspect of the present invention.

A transmitter section TX is apt to encode data information into a polarization multiplexed optical radiation comprising two optical channels orthogonally polarized. The transmitter section TX may include optical sources (e.g. lasers), modulators (e.g. electro-optic modulators), wavelength multiplexers, polarization multiplexers, optical boosters, etc. One of the two channels, hereinafter referred to as the identified channel, is provided with a pilot signal which may serve to uniquely identify said channel. Optionally, the other of the two channels may also be provided with a second pilot signal uniquely identifying it.

The pilot signal may be a superimposed modulation such as for example an amplitude or intensity modulation, a phase modulation, an optical frequency modulation or a polarization modulation, or it may be an identifying clock, for example an identifying bit-clock. The superimposed modulation may follow any given waveform, such as for example an harmonic wave (hereinafter called pilot tone in case of intensity modulation) or a square wave (usually called dither). The frequency of modulation of the superimposed modulation should be low enough with respect to the data modulation rate (bit-rate) in order not to degrade the transmission quality. For example, in case of a bit-rate of 622 Mb/s or greater, it is advantageous to set the pilot signal frequency less than or equal to 10 MHz. On the other end, the frequency of modulation of the pilot signal should be high enough to differ from the continuous (zero frequency) spectral component. A possible range for the pilot signal frequency is from 1 kHz to 10 MHz, including the ends of range.

The two channels are launched into an optical transmission line 2 with mutually orthogonal state of polarization. The optical transmission line 2 may include for example an optical cable comprising optical fibers. Optical line amplifiers LA, such as for example EDFAs, may be distributed along the optical transmission line 2. Also, one or more optical processing units OPU may be placed along the line 2 in order to perform operations on the optical signal such as routing, regeneration, add and/or drop, switching and the like. A receiver section RX is placed at the end of the transmission line 2 or whenever the optical signal needs to be received (e.g. at the OPU), in order to convert the optical signal into an electrical signal. It may comprises optical pre-amplifiers, optical filters, photodetectors, electrical filters, etc.

A polarization stabilizer device 100 according to the present invention is placed upstream the receiver section RX in order to stabilize the SOP of the polarization multiplexed optical radiation to a defined SOP before inputting the receiving section RX. In other words, the SOP of one of the two optical channels inputting the polarization stabilizer device 100 is converted to a defined SOP and consequently the SOP of the other of the two optical channels is uniquely stabilized to a SOP orthogonal to the defined SOP. Throughout the present description, reference will be made to the SOP of the identified channel, being the SOP of the other optical channel uniquely determined.

In case a wavelength division multiplexing (WDM) technique is used in combination with PolDM in the optical transmission system 1, each WDM carrier wavelength comprises two orthogonally polarized channels wherein one channel of each couple is identified by a pilot signal. In this case, a wavelength demultiplexer D-MUX may be placed upstream the polarization stabilizer 100 in order to separate, at least partially, the different optical wavelengths.

Advantageously, a polarization selective element PS, for example a polarization division demultiplexer such as a polarization beam splitter having its azimuth oriented parallel or perpendicular to the defined SOP, may be placed at the output end of the polarization stabilizer device 100 in order to separate the two polarization multiplexed channels. The polarization selective element PS may be integrated either within the polarization stabilizer device 100 or within the receiver section RX.

In case the two orthogonally polarized optical channels are closely spaced in the optical spectrum without overlapping (polarization-interleaved WDM), it is preferable to superimpose a pilot signal to each WDM channel. For example, odd channels have a first pilot signal and even channels have a second pilot signal (e.g. having frequency different from the first one). In this case, the wavelength demultiplexer D-MUX placed upstream the polarization stabilizer device 100 passes the desired WDM channel and one or more undesired adjacent optical channels. The desired WDM channel has a SOP orthogonal to the SOP of the adjacent channels. In polarization-interleaved WDM the polarization selective element PS is advantageously a linear polarizer. The polarization stabilizer device 100 thus acts to align the SOP of the desired WDM channel to the polarizer by making use of the pilot signal of the desired channel. The residual portion of the adjacent WDM channels are thus filtered out by the polarizer.

Figure 2:
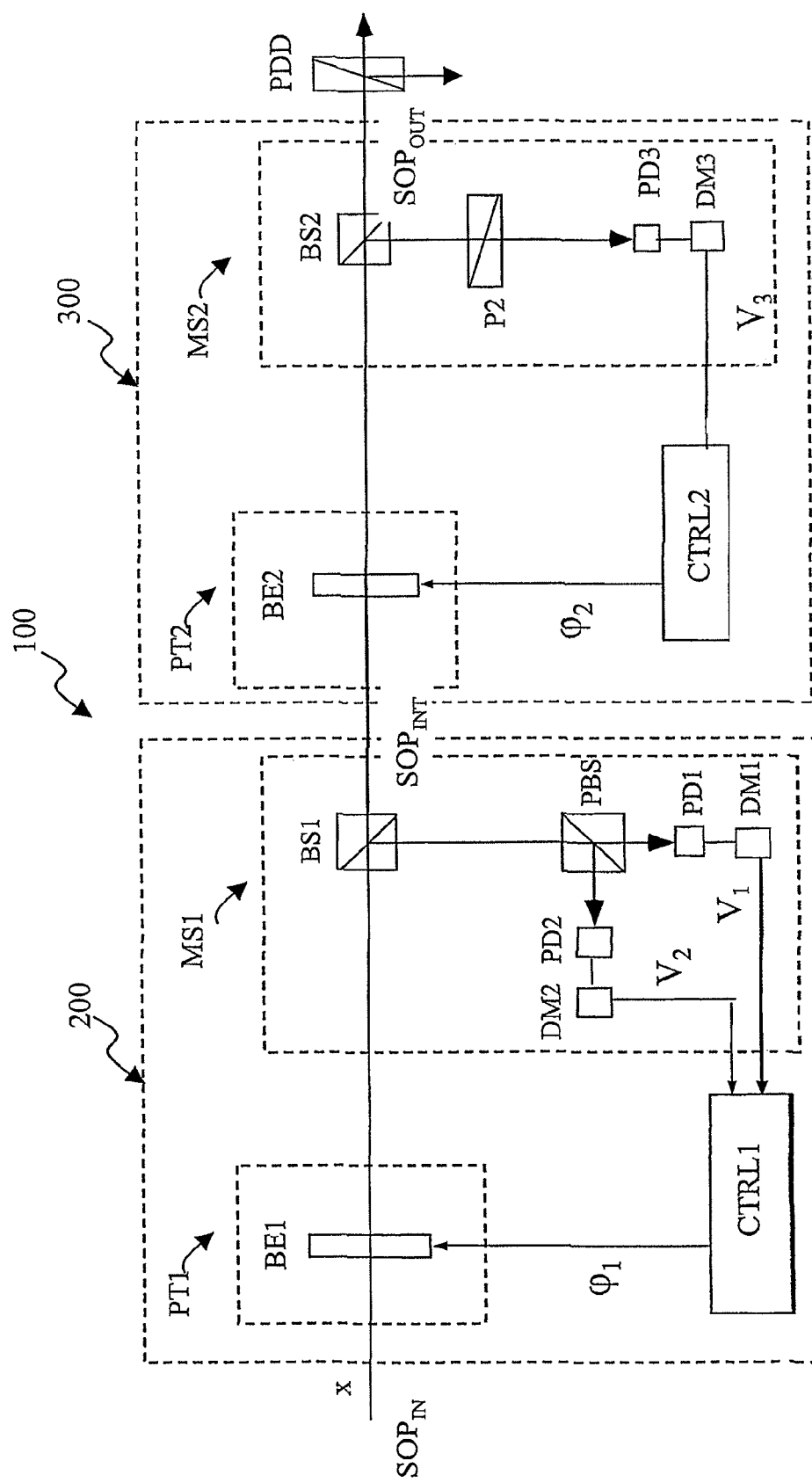
FIG. 2. Schematic drawing of a base architecture of the polarization stabilizer device according to the present invention.

FIG. 2 is a schematic representation of a base architecture of the polarization stabilizer device 100 according to the present invention.

The device 100 comprises a first and a second stage 200 and 300.

The device 100 has a principal beam path 'x' along which a polarization multiplexed optical radiation is received as an input optical radiation of arbitrary state of polarization of the identified channel (labeled $SOP_{IN}$ in the figure); the radiation then traverses the first stage 200 and outputs the first stage 200 with a SOP (labeled $SOP_{INT}$) having the polarization azimuth at a predefined value. Conventionally, the polarization azimuth will range from −90° to +90° modulus 180°. For the purpose of the present invention, a predefined value of the polarization azimuth means a couple of angular values differing of 90°. Examples of predefined polarization azimuth are (−30°, +60°) or (0°, +90°) or (−45°, +45°). It is noted that also the polarization azimuth of the other orthogonally polarized channel is at the same predefined value. The polarization multiplexed optical radiation then traverses the second stage 300 and is emitted from the device 100 as an optical radiation having a stabilized defined SOP of the identified channel (labeled $SOP_{OUT}$) and an optical power not depending on the input SOP. Without loss of generality, the defined SOP may be the linear vertical SOP having defined vertical azimuth and defined zero ellipticity.

The first stage 200 comprises a polarization transformer PT1 which is apt to give to the optical radiation propagating through it a first controllable polarization transformation. The polarization transformer PT1 may comprise a birefringent element BE1 or a combination of single birefringent elements including BE1.

The first stage 200 also comprises a monitoring system MS1 which is responsive to the pilot signal of the identified channel and is apt to measure uniquely the optical power of a polarized portion of the identified channel outputting from the polarization transformer PT1. Throughout the present description, the term "polarized portion" or "polarized component" means the projected component of the optical radiation along a given SOP. For sake of clarity, in case of deviation of the optical radiation, for example a reflection by a beam splitter, the reference system for the SOP is accordingly transported.

The first stage 200 also comprises a controller CTRL1 (e.g. an electronic controller or a computer) which is apt to control the first controllable polarization transformation, given by the polarization transformer PT1 through e.g. the birefringent element BE1, in response to the optical power of the polarized portion of the identified channel measured by the monitoring system MS1, so that the azimuth of the SOP of the identified channel outputting from the polarization transformer PT1 remains at a target predefined value. The controller CTRL1 is connected to the monitor system MS1 and to the polarization transformer PT1. The second stage 300 comprises a polarization transformer PT2 which is apt to give to the optical radiation propagating through it a second controllable polarization transformation. The polarization transformer PT2 may comprise a birefringent element BE2 or a combination of birefringent elements including BE2. The second stage 300 also comprises a monitoring system MS2 which is responsive to the pilot signal of the identified channel and is apt to measure uniquely the optical power of a polarized portion of the identified channel outputting from the polarization transformer PT2.

The second stage 300 also comprises a controller CTRL2 (e.g. an electronic controller or a computer) which is apt to control the second controllable polarization transformation, given by the polarization transformer PT2 through e.g. the birefringent element BE2, in response to the optical power of the polarized portion of the identified channel measured by the monitoring system MS2, so that the SOP of the identified channel outputting from the polarization transformer PT2 remains at a defined SOP. The controller CTRL2 is connected to the monitor system MS2 and to the polarization transformer PT2.

Although, for the sake of clarity, two separate controllers CTRL1 and CTRL2 have been described and represented in FIG. 2, it can be appreciated that a single controller can advantageously be employed, connected in input to the monitoring systems MS1 and MS2 and in output to the polarization transformers PT1, PT2. Advantageously, a polarization division demultiplexer PDD, which is a particular embodiment of the polarization selective element PS of FIG. 1, may be placed along the main beam path 'x' downstream the second stage 300 to separate the polarization multiplexed optical channels. For example, a polarizing beam splitter oriented with its azimuth extending parallel or perpendicular to the defined output azimuth.

The polarization transformers PT1 and PT2 are placed on the principal beam path 'x'. The birefringent element BE1 and BE2 may be any kind of birefringent element apt to give a variable polarization transformation, such as for example a variable retarder having fixed eigenstates and variable phase retardation, or birefringent element having fixed phase retardation and variable eigenstates (e.g. rotating axes), or variable eigenstates and variable phase retardation.

In general any physical mechanism producing a birefringence can be exploited to realize the birefringent elements used in the polarization stabilizer device 100 of the present invention. For example, they may be based on the magneto-optic effect (e.g. Faraday rotator), the electro-optic effect (such as the nematic liquid-crystal retarders or the electro-optic crystals belonging to the symmetry point group of the zincblende such as zinc sulfide (ZnS) with its ternary or higher order compounds (e.g. ZnSSe); cadmium telluride (CdTe) with its ternary or higher order compounds (e.g. CdZnTe); gallium arsenide (GaAs) with its ternary or higher order compounds (e.g. AlGaAs, InGaAsP); and the like) or the elasto-optic effect (such as squeezers).

The monitor systems MS1 and MS2 are associated to the principal beam path They are designed to be responsive to the pilot signal. Accordingly, they are apt to identify the identified channel through the pilot signal and to measure only the optical power of the identified channel.

In FIG. 2, it is shown an exemplary embodiment of the monitoring systems MS1 and MS2 apt to be used in connection with a superimposed amplitude or intensity modulation as the pilot signal of the identified channel.

Accordingly, the monitoring systems MS1 and MS2 of the first and second stage 200 and 300 may comprise a polarization insensitive beam-splitter, respectively BS1 and BS2, arranged in the beam path 'x' downstream the respective polarization transformer PT1 and PT2. BS1 and BS2 are apt to extract a small fraction of the optical radiation outputting from the respective polarization transformer PT1 and PT2. For minimum losses, the extracted portion of the radiation should be vanishingly small. However, in practice, the diverted portion needs to be large enough to provide a reasonable signal-to-noise ratio for subsequent processing associated with the control loop. A diverted power fraction of between 1 and 10% may be typical. It will be appreciated that other optical components can provide the same function of extracting a small fraction of the beam, for example an optical fiber coupler.

The monitor system MS1 of the first stage 200 may comprise a polarizing beam splitter PBS optically connected to the beam splitter BS1, as shown in FIG. 2. The PBS is apt to receive the optical radiation extracted by the beam splitter BS1. The azimuth of the PBS is approximately at ±45° with respect to the predefined azimuth. For example, at a predefined azimuth of (−30°, +60°) corresponds a PBS azimuth of +15° or −75°. In other words, the PBS is apt to separate a linearly polarized portion of the extracted optical beam having an azimuth at +45° to the predefined azimuth from a linearly polarized portion of the optical radiation having an azimuth at −45° to the defined azimuth.

Throughout the present description, a polarization beam splitter PBS is functionally equivalent, and interchangeable, to a polarization insensitive beam splitter followed by two orthogonally oriented linear polarizers, one for each output of the polarization insensitive beam splitter. Optical fiber or optical waveguides components can also be used to provide the same function.

It is noted that at each output of the PBS, the polarized portions of both the polarization multiplexed optical channels are present and overlapping.

A first and a second photodiode PD1 and PD2 may be optically connected to the polarizing beam splitter PBS, one for each output of the PBS. They are apt to detect the two polarized components of the optical radiation outputting respectively from the two outputs of the PBS and to generate respective signals responsive of the optical power of these two polarized components.

In particular applications, for example when the power of the input optical beam is known and can be held constant, either photodiode PD1 or photodiode PD2 may be omitted. In this case, the polarizing beam splitter PBS may be replaced by a fixed linear polarizer oriented either at +45° or −45° to the predefined azimuth.

The monitor system MS2 of the second stage 300 may comprise a linear polarizer P2, preferably fixed, optically connected at the reflected output of the beam splitter BS2, as shown in FIG. 2. The polarizer P2 is apt to receive the optical radiation extracted by the beam splitter BS2. The azimuth of the P2 is approximately parallel or perpendicular with respect to the defined output SOP. In other words, the polarizer P2 is apt to pass a linearly polarized portion of the extracted optical beam having a SOP parallel or perpendicular to the defined SOP.

A photodiode PD3 may be connected to the output end of the polarizer P2 and is apt to measure the optical power of the extracted polarized portion and generate a signal responsive of this power.

A first, a second and a third demodulator DM1, DM2 and DM3 may be connected to the first, second and third photodiode PD1, PD2 and PD3, respectively. The first, second and third demodulator DM1, DM2 and DM3 are apt to receive respective signal from first, second and third photodiode PD1, PD2 and PD3 and to respond to the pilot signal. For example, in case a pilot tone (sinusoidal amplitude modulation) is used for the identified channel, each demodulator executes a passband filtering of the electrical signal generated by the corresponding photodiode, around the pilot tone frequency. Such a filtered signal, neglecting the noise terms, can be expressed as a sinusoid at a pilot tone frequency $f_{PT}$ with an amplitude of modulation $A_i$ (t) according to:

$$s_i(t) = A_i(t)\sin(2\pi f_{PT} t) \quad (1)$$

where i=1, 2, 3 refer respectively to the first, second and third demodulator DM1, DM2 and DM3. The i-th pilot tone amplitude $A_i(t)$ is directly proportional to the optical intensity of solely the polarized portion of the identified channel incident on the corresponding i-th photodiode. The action of the demodulators is to measure these pilot tone amplitudes $A_i(t)$, carrying the information about the SOP of the identified channel and used by the controllers CTRL1 and CTRL2 for the SOP stabilization. Such a demodulator DM1, DM2 or DM3 can be realized by using any electrical scheme among those well known in radio engineering for detecting an amplitude modulation of a carrier. For example the demodulator may be based on envelope detection or coherent detection schemes.

The first, second and third demodulator DM1, DM2 and DM3 may generate respective output signals $V_1$, $V_2$ and $V_3$, indicative of the respective pilot tone amplitudes $A_1$, $A_2$ and $A_3$, which in turn are indicative of the optical powers of the respective polarized portions of the identified channel. It will be appreciated that these signals may be in electronic form, with the photodiodes being optoelectronic converters and the demodulators being electronic circuits. However, it will also be appreciated that these processing elements could be embodied with all-optical components of the same functionality. This may be desirable for stabilizing extremely high frequency polarization instabilities where all-optical power sensing and control processing could be performed. In addition, the signals $V_1$, $V_2$ and $V_3$ may also be radio signals. It will be also appreciated that demodulation of the pilot signal may be performed directly by the photodiodes PD1, PD2 and PD3.

In those applications, described above, wherein either photodiode PD1 or photodiode PD2 may be omitted, also the respective demodulator DM1 or DM2 and the respective signal $V_1$ or $V_2$ may be omitted.

The function of the first stage 200 of the device 100 is to transform any input SOP of the identified channel into an elliptical output SOP ($SOP_{INT}$) with major axis (said polarization azimuth) at a predefined azimuth.

In operation, the input polarization multiplexed optical radiation having an identified channel traverses the polarization transformer PT1. The polarization transformer gives to the optical radiation a variable controllable polarization transformation, such that the SOP of the identified channel is transformed from $SOP_{IN}$ to $SOP_{INT}$, outputting from the polarization transformer PT1, wherein $SOP_{INT}$ has an azimuth at a predefined value.

A feedback control loop is designed to lock the polarization azimuth of the SOP ($SOP_{INT}$) of the identified channel outputting from the polarization transformer PT1 to the target azimuth value (as defined above, a couple of values mutually orthogonal). Accordingly, the monitoring system MS1 measure the optical power of a polarized portion of solely the identified channel, wherein the polarized portion is preferably the linearly polarized portion having an azimuth at ±45° to the defined azimuth. The monitoring system MS1 may generate an output signal $V_1$ indicative of such optical power.

The controller CTRL1 of the first stage 200 is connected to the monitoring system MS1 and it is apt to receive the signal $V_1$. The controller CTRL1 has an output connected to the birefringent element BE1 of the polarization transformer PT1. The controller CTRL1 is apt to generate an output control signal (labeled $\phi_1$ in FIG. 2), responsive to, the signal $V_1$, according to a control algorithm. The output control signal $\phi_1$ is suitable to be sent to, and to control the polarization transformation by, the birefringent element BE1 in order to lock the polarization azimuth of the identified channel outputting from the polarization transformer PT1 at the defined azimuth.

The control algorithm is a simple cyclic control algorithm that can be implemented on a digital PC-based controller (CTRL1), or any other suitable hardware, firmware, software or combination thereof. An all-optical processor could also be used for the controller.

Preferably, the control algorithm contains a calculation of an error value, related to the signal $V_1$, which is related to the displacement of the polarization azimuth of the identified channel outputting from the polarization transformer PT1 from the defined azimuth value. The aim of the control algorithm and, more in general, of the control feedback loop is to minimize the above error.

For example, the error may be defined so that it is ideally zero when the linearly polarized components of the identified channel (between the two stages 200 and 300) at +45° and at −45° to the defined azimuth have equal optical power.

The minimization of the error is achieved by controlling the polarization transformation applied by the birefringent element BE1. The polarization transformation applied by the birefringent element BE1 is typically varied in a continuous or quasi-continuous manner, with a discretization that follows from the stepwise incremental nature of the computer-implemented control scheme. It is convenient that the steps in the polarization transformation have a constant absolute value, although non-constant steps, for example dependent on the absolute value of the polarization transformation, could be used. In general, the smaller the step, the better the stabilization (smaller uniformity error), but a trade-off with the stabilization speed need to be considered.

At each control period or step the signal control $\phi_1$ of BE1 may be changed so that the respective polarization transformation changes by a constant quantity. At each step the control algorithm calculates the error: if the error at the current step becomes larger than the error at the previous step, then the sign of the polarization transformation variation is changed, else the sign is not changed.

The elliptical SOP with fixed axes ($SOP_{INT}$), obtained as output of the first stage 200, is transformed by the second stage 300 into a fixed linear SOP with optical power independent from the input SOP. In detail, the polarization multiplexed optical radiation outputting the first stage 200 traverses the polarization transformer PT2. The polarization transformer PT2 gives to the optical radiation a further controllable polarization transformation, such that the SOP of the identified channel is transformed from $SOP_{INT}$ to $SOP_{OUT}$, outputting from the polarization transformer PT2, wherein $SOP_{OUT}$ is a defined SOP (defined azimuth and defined ellipticity). For sake of clarity, the defined azimuth of the defined output SOP may be different from the predefined azimuth described above.

The feedback control loop of the second stage 300 of FIG. 2 is designed to lock the SOP (SOP$_{OUT}$) of the identified channel outputting from the polarization transformer PT2 to the target SOP in a way similar to the feed-back control loop of the first stage 200. To this purpose, the monitoring system MS2 measure the optical power of a polarized portion of solely the identified channel, wherein the polarized portion is preferably the linearly polarized portion parallel or perpendicular to the defined SOP. The monitor system MS2 generates respective output signal V$_3$.

The controller CTRL2 of the second stage 300 is connected to the monitor system MS2 and it is apt to receive the signal V$_3$. The controller CTRL2 has an output connected to the birefringent element BE2 of the polarization transformer PT2. The controller CTRL2 is apt to generate an output control signal (labeled $\phi_2$ in FIG. 2), responsive to the signal V$_3$, according to a control algorithm similar to that described with reference to the first stage 200. The output control signal $\phi_2$ is suitable to be sent to, and to control the polarization transformation by, the birefringent element BE2 in order to lock the state of polarization of the identified channel outputting from the polarization transformer PT2 at a defined SOP.

The controller CTRL2 may execute the same control algorithm as the first stage 200, the only difference being that the error is correlated to V$_3$. The aim of the feed-back is to minimize or maximize (depending on the azimuth orientation of the fixed polarizer P2) this error.

The fact that the first stage 200 is controlled independently of the second stage 300 is highly advantageous, since the provision of two stages does not lead to any additional complexity to the control, since no time synchronization between the first and second respective controllers CTRL1 and CTRL2 is required.

Separate controllers CTRL1 and CTRL2 are shown for the first 200 and second stage 300 of FIG. 2, consistent with the functional independence of the control algorithms of the two stages from one another. However, it will be understood that the two controllers could be embodied in a single hardware, firmware or software unit.

Therefore, the device 100 may comprise a single controller apt to control, responsively to the optical power of the polarized portion of the identified channel downstream the polarization transformer PT1, the variable polarization transformation provided by the polarization transformer PT1 so as to maintain the polarization azimuth of the identified channel downstream the first polarization transformer PT1 at the predefined azimuth, and is further apt to control, responsively to the optical power of the polarized portion of the identified channel outputting from the polarization transformer PT2, the variable polarization transformation provided by the polarization transformer PT2 so as to maintain the state of polarization of the identified channel downstream the second polarization transformer PT2 at a predefined state of polarization.

Figure 2A:
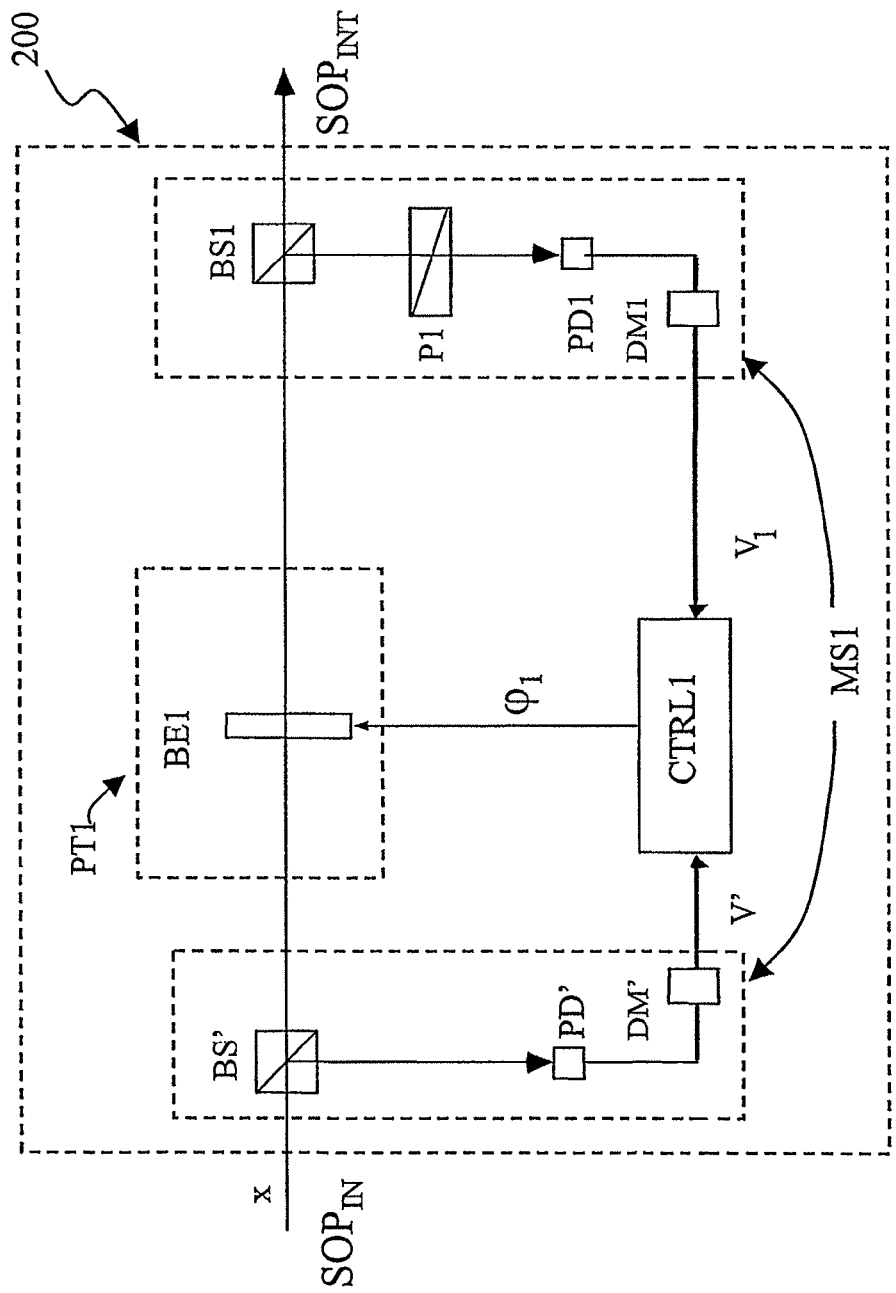
FIG. 2a. Schematic drawing of an alternative configuration of the first stage of the polarization stabilizer device of FIG. 2.

FIG. 2*a* shows a possible alternative configuration of the first stage 200 of the polarization stabilizer device 100 which is suitable to be used in combination with a superimposed intensity modulation as pilot signal of the identified optical channel. The alternative configuration of the first stage 200 shown in FIG. 2*a* essentially differs from the configuration of the first stage 200 shown in FIG. 2 in the monitoring system MS1. The devices of stage 200 of FIG. 2*a* that are identical to the devices of stage 200 of FIG. 2 will be indicated with the same reference numeral.

A polarization insensitive beam-splitter BS' (e.g. with a 90/10 split ratio) may be arranged in the beam path 'x' and it is apt to extract a small fraction (e.g. 10% in this example, or 1%) of the input optical beam. The extracted fraction of the input optical beam is directed to a photodiode PD' which is apt to measure the power of the extracted fraction. A demodulator DM' is connected to the output of photodiode PD'.

The beam splitter BS' shown in FIG. 2*a* is located upstream the polarization transformer PT1, but possible variations would be to arrange the polarization insensitive beam splitter BS' along the beam path 'x' either between the polarization transformer PT1 and the beam splitter BS1 or downstream the beam splitter BS1. Alternatively, the beam splitter BS' can be also located between the beam splitter BS1 and the polarizer P1.

As shown in FIG. 2*a*, a fixed linear polarizer P1 is apt to receive the optical radiation extracted by the beam splitter BS1. The azimuth of the linear polarizer P1 may be oriented either at +45° or −45° to the predefined azimuth (couple of angular values). A photodiode PD1, with its associated demodulator DM1, is optically connected to P1 so that it is apt to measure the power of the polarized component transmitted by P1.

The principle of operation of the first stage 200 of FIG. 2*a* is similar to the one exemplarily described for the first stage 200 of FIG. 2. It is provided a monitoring system MS1 comprising elements (e.g. BS1, P1, PD1, DM1) having the function of extracting a polarized portion (e.g. at +45° or −45° to the defined azimuth) of the optical radiation outputting from the polarization transformer PT1 and generating a signal V$_1$ responsive to the optical power of the extracted polarized portion of solely the identified channel, via a demodulation operation performed, e.g., by a demodulator DM1. The detecting system of the first stage 200 of FIG. 2*a* further comprises elements (e.g. BS', PD', DM') having the function of extracting a portion of the optical radiation along the beam path 'x' and generating a signal V' responsive to the pilot signal and indicative of the optical power of solely the identified channel propagating along the beam path 'x'.

A controller CTRL1 generates an error value by comparing the optical power of the extracted polarized portion of the identified channel (represented by V$_1$) with a value which is the expected value for this polarized component when the identified channel outputting from the polarization transformer PT2 has a polarization azimuth at a defined value. Such expected value is calculated based on the signal V'. For example, the error value may be defined as $\epsilon = |V' - \alpha V_1|$, wherein a serves for the comparison of the extracted polarized portion (V$_1$) with an expected value derived from V'. This error serves, through a cyclic feedback algorithm similar to the one described above, to control the proper polarization transformation at each control step.

Throughout the following description, it will be exemplarily assumed that the identified channel is identified by a pilot tone, that is to say a superimposed sinusoidal amplitude modulation, preferably having low amplitude and low frequency.

A first embodiment of the polarization stabilizer device of FIG. 2 will now be described with reference to FIG. 3. The same reference numerals will be used for elements in FIG. 3 identical to corresponding elements in FIG. 2. This embodiment is endless and has no intrinsic loss. In other words, in perfect lossless operation of the components of the optical device 100, the polarization stabilized output optical radiation can potentially have up to the full power of the input optical radiation.

Figure 3:
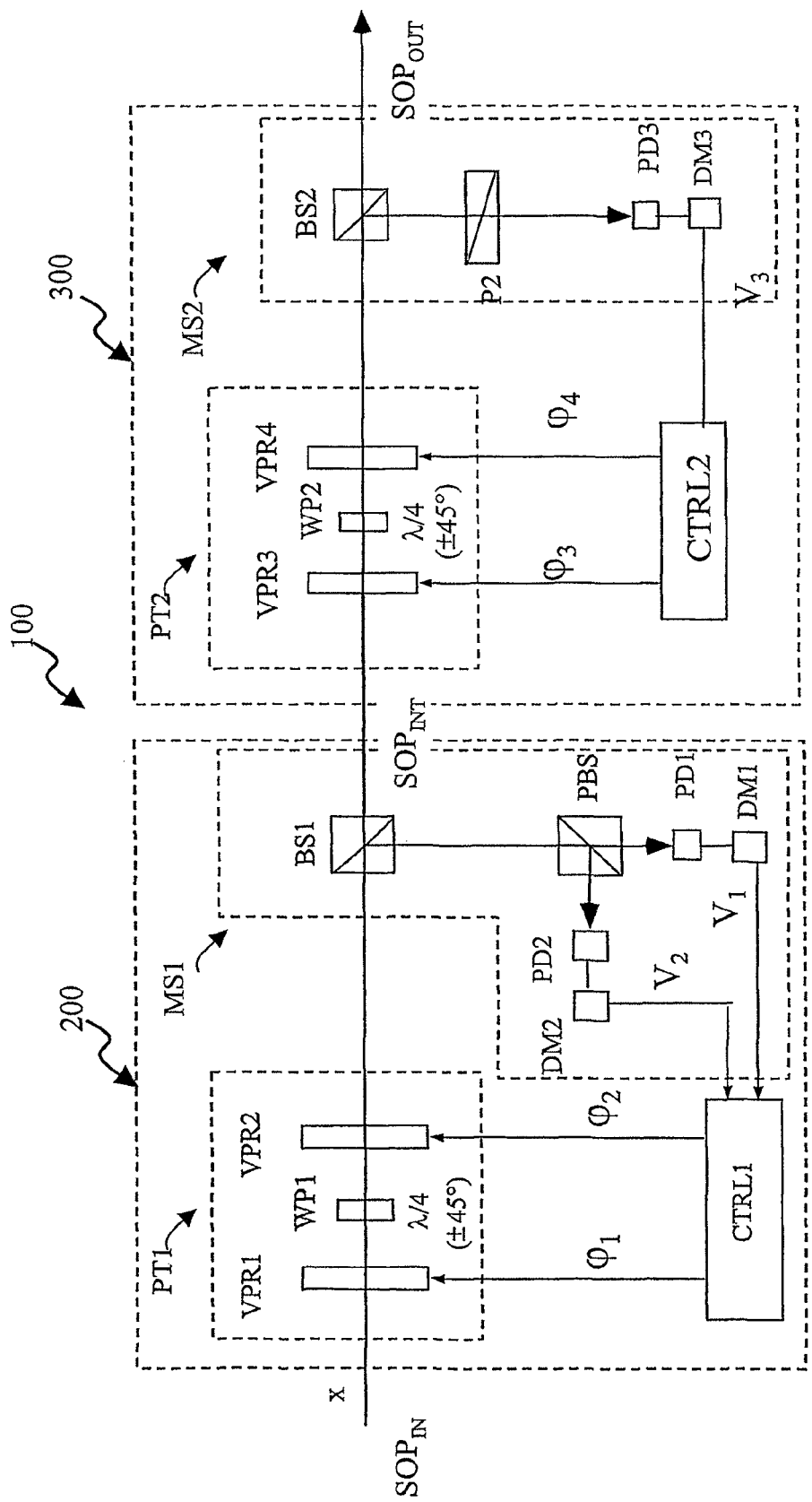
FIG. 3. Schematic drawing of a first exemplary embodiment of the polarization stabilizer device of FIG. 2.

The device 100 of FIG. 3 is apt to receive a polarization multiplexed optical radiation as an input optical radiation having an identified channel comprising a pilot signal with arbitrary state of polarization (labeled $SOP_{IN}$ in the figure). The polarization multiplexed optical radiation is emitted from the device 100 as an optical radiation having a stabilized defined SOP of the identified channel (labeled $SOP_{OUT}$) and an optical power not depending on the input SOP. The defined SOP has a defined azimuth and a defined ellipticity. Without loss of generality, the defined SOP may be the linear vertical SOP having the defined azimuth vertical and the defined ellipticity zero.

The device 100 comprises a first and a second stage 200 and 300.

The polarization multiplexed optical radiation traverses the first stage 200 and outputs the first stage 200 with a SOP (labeled $SOP_{INT}$) having the polarization azimuth at ±45° with respect to the defined output azimuth (i.e. (−45°, +45°) having assumed a vertical output azimuth). The optical radiation then traverses the second stage 300.

The first stage 200 comprises a polarization transformer PT1 comprising a first and second variable rotators VPR1 and VPR2, which are variable circularly birefringent elements with controllable phase retardations $\Phi_1$ and $\Phi_2$, respectively. A (polarization) rotator can be seen as a birefringent element with circular eigenstates, that is an element that rotates the azimuth of the SOP. A circularly birefringent element giving a phase retardation $\Phi$ between the circular eigenstates causes a rotation of an angle $\Phi/2$ of the polarization azimuth. The first variable rotator VPR1 has an associated controllable phase retardations $\Phi_1$ which may have a finite range, i.e. it may have an upper limit or a lower limit, or both. Advantageously, it may assume one out of two retardation values which are integer multiples of $\pi$ radians and differ by an odd integer multiple of $\pi$ radians. The second variable rotator VPR2 has an associated controllable phase retardations $\Phi_2$ which may have a finite range. Advantageously, it may smoothly vary at least in a range from $k\pi$ to $(k+k')\pi$ radians, wherein k is an integer and k' is an odd integer.

In a preferred configuration, the variable rotators VPR1 and VPR2 are variable Faraday rotators, i.e. variable polarization rotators which make use of the magneto-optical Faraday effect and wherein the magnetic field applied to a magneto-optical material is varied.

The polarization transformer PT1 also comprises a quarter-wave plate WP1 optically interposed between the first and second variable rotators VPR1 and VPR2 and having the eigenaxes oriented at ±45 degree with respect to the defined azimuth. The quarter-wave plate WP1, as well any other component in the present invention, may be replaced by a technical equivalent, such as a combination of birefringent elements performing the same function, without exiting from the scope of the present invention. In a preferred configuration, the polarization transformer PT1 consists, for what concerns the optical birefringent elements, only of the first and second variable rotators VPR1 and VPR2 and the quarter-wave plate WP1 optically interposed therebetween. Such a polarization transformer PT1 is advantageous due to its simplicity and consequently low insertion loss, high feasibility and high accuracy.

A monitoring system MS1 is provided to the first stage 200 in all similar to that described with reference to FIG. 2. Alternatively, the monitoring system MS1 of FIG. 2a may be used. It comprises a polarization insensitive beam-splitter BS1 to extract a small fraction of the optical radiation outputting from the second variable rotator VPR2, a polarizing beam splitter PBS having azimuth approximately parallel or perpendicular to the defined azimuth, a first and a second photodiode PD1 and PD2, and a first and a second demodulator DM1 and DM2 apt to generate respective signals $V_1$ and $V_2$ responsive of the optical power of, respectively, the two polarized components of solely the identified channel outputting form the PBS.

A controller (e.g. electronic) CTRL1 is connected to the first and second demodulator DM1 and DM2 and it is apt to receive the signals $V_1$ and $V_2$. The controller CTRL1 has first and second outputs connected respectively to the first and second rotators VPR1 and VPR2. The controller CTRL1 is apt to generate output control signals (labeled $\phi_1$ and $\phi_2$ in FIG. 3), responsive to the signals $V_1$ and $V_2$, according to a control algorithm described further below. The output control signals $\phi_1$ and $\phi_2$ are suitable to be sent to, and to control the phase retardations $\Phi_1$ and $\Phi_2$ of, the rotators VPR1 and VPR2, respectively.

In particular applications, photodiode PD2 (and consequently demodulator DM2) may be omitted. In this case, the polarizing beam splitter PBS may be replaced by a fixed linear polarizer oriented either parallel or perpendicular to the defined azimuth.

The function of the first stage 200 is to transform any input SOP of the identified channel into an elliptical output SOP ($SOP_{INT}$) with principal axes at ±45 degrees to said defined azimuth.

In operation, the input polarization multiplexed optical radiation traverses sequentially the first variable rotator VPR1, the quarter-wave plate WP1 and the second variable rotator VPR2. The first variable rotator VPR1 and the second variable rotator VPR2 rotate the azimuth of the optical radiation by respectively a first and a second variable angle $\Phi_1/2$ and $\Phi_2/2$, such that, in combination with the fixed action of the quarter-wave plate WP1, the SOP of the identified channel outputting from the second variable rotator VPR2 ($SOP_{INT}$) has an azimuth at ±45 degrees with respect to the defined output azimuth.

A feedback control loop is designed to lock the polarization azimuth of the SOP ($SOP_{INT}$) of the identified channel outputting from the second rotator VPR2 to the target azimuth value equal to ±45 degrees with respect to the defined azimuth. The polarization insensitive beam splitter BS1 diverts a portion of the beam out of the main beam path 'x'. The diverted portion of the beam is then received by the polarizing beam splitter PBS which splits the diverted beam portion into its two orthogonal polarization components, which are supplied to, and detected by, the respective photodiodes PD1 and PD2. The demodulators DM1 and DM2 act on the signals generated by the photodiodes PD1 and PD2 and they supply respective signals $V_1$ and $V_2$ as input signals to the controller CTRL1.

The controller CTRL1 executes an algorithm described below and generates the two signals $\phi_1$ and $\phi_2$, responsive of signals $V_1$ and $V_2$, controlling the phase retardations $\Phi_1$ and $\Phi_2$ respectively of VPR1 and VPR2. The algorithm may contain a calculation of an error value which is related to the displacement of the polarization azimuth of the optical radiation outputting from the second variable rotator VPR2 from the target azimuth value. The aim of the control loop is to minimize the above error.

For example, the error may be defined as $\epsilon = |V_1 - \alpha V_2|$, where the parameter $\alpha$ is determined so that the error is ideally zero when the linearly polarized components of the identified channel parallel and perpendicular to the defined azimuth have equal optical power. This condition is equivalent to the target of an elliptical $SOP_{INT}$ with principal axes at ±45 degrees to said defined azimuth. For example, considering the case of the stabilizer device 100 of FIG. 3 having an ideal PBS and photodiodes PD1 and PD2 having equal responsivities, the value of α may be chosen equal to 1. In general, different devices may have different values for the parameter α.

In those applications, described above, wherein photodiode PD2 may be omitted, there is acquired at each control period of the feedback loop only one signal $V_{out}$ responsive of the optical power of a polarized component of solely the identified channel and the error is defined as $\epsilon=|V_{out}-V_{ref}|$, where $V_{ref}$ is set via the CTRL1 taking into account the input optical power and the behavior of the optical elements, e.g. their insertion losses.

The minimization of the error is achieved by controlling the phase retardations $\Phi_1$ and $\Phi_2$ of the two variable rotators VPR1 and VPR2. The phase retardation $\Phi_2$ applied by the second variable rotator VPR2 is varied in a continuous or quasi-continuous manner, with a discretization that follows from the stepwise incremental nature of the computer-implemented control scheme. It is convenient that the steps in the phase retardation $\Phi_2$ have a constant absolute value $\vartheta$, referred to as the "step angle $\vartheta$", although non-constant step angles, for example dependent on the absolute value of the phase retardation $\Phi_2$, could be used. For example, $\vartheta=\pi/180$ radians.

In general, the smaller the step angle size, the better the stabilization (smaller uniformity error), but a trade-off with the stabilization speed need to be considered. In fact, for a given step angle size $\vartheta$, the maximum SOP fluctuation on the Poincaré sphere (see below) in the step time of the control loop that can be compensated for is about $\vartheta/2$.

The retardation $\Phi_2$ of VPR2 is varied by the controller CTRL1 in a predefined range from $k\pi$ to $(k+k')\pi$ radians, wherein k is an integer and k' is an odd integer different from zero. Preferably, k' is equal 1. Such a range may be for example between 0 and $\pi$ radians or between $\pi$ and $2\pi$ or between $2\pi$ and $3\pi$.

Whenever the input SOP varies to cause the retardation $\Phi_2$ reach a threshold of the predefined range (e.g. $k\pi$ or $(k+k')\pi$), then the retardation $\Phi_1$ of the first variable rotator VPR1 is switched by the controller CTRL1 between the values $m\pi$ and $(m+m')\pi$ radians, wherein m is an integer and m' is an odd integer different from zero. Preferably m' is equal to 1. For example, m may be equal to 0, 1 or 2. At the same time the sign of the phase retardation increments on the second variable retarder is reversed. In the normal mode of operation, when the retardation of VPR2 is not at threshold limit, then the retardation of VPR1 is kept constant at, e.g., 0 or $\pi$ radians. The switching of the retardation of VPR1 allows to overcome the finite birefringence range wherein VPR2 is operated and to obtain an endless polarization stabilization, while avoiding any cumbersome reset procedure. As will be explained below, the combination of VPR1, WP1 and VPR2 are so that the azimuth value of the output SOP ($SOP_{INT}$) is not appreciably perturbed during the switching of rotator VPR1, provided that the input SOP variation is sufficiently small in the switching time.

At each control period or step the signal control $\phi_2$ of VPR2 may be changed so that the respective phase retardation $\Phi_2$ changes by a quantity of constant step angle θ. At each step the control algorithm calculates the error: if the error at the current step becomes larger than the error at the previous step; then the sign of the retardation variation is changed, else the sign is not changed. The signal control $\Phi_1$ of the phase retardation of VPR1 is kept constant as long as $\Phi_2$ is not a limit of the predefined range, e.g. [0, π]. If the value $\Phi_2$ has reached a range limit and the sign of the retardation variation would lead next step $\Phi_2$ outside of the range, then the value of $\Phi_2$ is not changed at the successive step, whilst the variation sign is inverted and the value of $\Phi_1$ is commuted between 0 and π.

More precisely the control algorithm may consist of the following exemplary algorithm steps:
1. assignment of the constant α, depending on the behavior of the optical components;
2. initialization to zero of the error at the previous step $\epsilon_0$;
3. initialization of the Boolean value S that can assume only the values 0 or 1, corresponding to the commutation state of the first rotator VPR1;
4. initialization of the second rotator retardation $\Phi_2$ to the middle range value, e.g. π/2;
5. initialization of the variation sign σ of the phase retardation $\Phi_2$;
6. initialization of the absolute value $\vartheta$(step angle) of the variation of the phase retardation $\Phi_2$;
7. acquisition of $V_1$ from the first photodiode;
8. (optional in case of $V_{ref}$) acquisition of $V_2$ from the second photodiode;
9. calculation of the current error ε as absolute value of $(V_1-\alpha V_2)$;
10. if the current error ε is greater than the previous error $\epsilon_0$ then:
    10.1. inversion of the variation sign σ;
11. variation of $\Phi_2$ by a quantity of absolute value θ and sign σ;
12. if $\Phi_2$ is not between 0 and π then:
    12.1. inversion of the variation sign σ;
    12.2. variation of $\Phi_2$ by a quantity of absolute value $\vartheta$ and sign σ;
    12.3. negation of the Boolean state S, that means commutation of the state of the first rotator VPR1;
13. assignment of the current error ε to the previous error $\epsilon_0$;
14. updating of $\Phi_1$ as product between S and π;
15. output of the first phase retardation $\Phi_1$;
16. output of the second phase retardation $\Phi_2$;
17. return to algorithm step 7.

Referring to FIG. 3, the second stage 300 comprises a polarization transformer PT2 similar to the polarization transformer PT1 of the first stage 200 described above. Accordingly it comprises first and second variable rotators VPR3 and VPR4, for example similar to the variable rotators VPR1 and VPR2 of the first stage 200, and an interposed quarter-wave plate WP2 oriented at ±45 degree with respect to the defined azimuth. The elements VPR3, WP2 and VPR4 are arranged along the main beam path 'x' of the polarization stabilizer 100 so as to receive the polarization multiplexed optical radiation outputting from the polarization transformer PT1 of the first stage 200. The fully stabilized SOP of the identified channel outputting from the polarization stabilizer device 100 is labeled $SOP_{OUT}$. The monitoring system MS2 is identical to the one exemplarily described with reference to FIG. 2. Accordingly, it comprises a polarization insensitive beam splitter BS2, a fixed linear polarizer P2, a photodiode PD3, which is apt to generate, via a demodulator DM3, a signal $V_3$ responsive of the optical power of the extracted polarized portion of solely the identified channel.

A controller CTRL2 is connected to the demodulator DM3 and has first and second outputs connected to the first and second rotators VPR3 and VPR4 respectively. The signal $V_3$ is sent to an input of the electronic controller CTRL2 that generates as outputs, responsive to the input signal $V_3$, the control signals $\phi_3$ and $\phi_4$ for setting the rotators VPR3 and VPR4 to the appropriate phase retardation values $\Phi_3$ and $\Phi_4$.

The controller CTRL2 is operable to ensure that the third variable rotator VPR3 assumes preferably only two retardation values, e.g. 0 and π radians, while the fourth variable rotator VPR4 has a retardation step-wise smoothly varying, preferably in the range from 0 to π radians.

Separate controllers CTRL1 and CTRL2 are shown for the polarization stabilizer 100, consistent with their functional independence from one another. However, it will be understood that the two controllers could be embodied in a single hardware, firmware or software unit.

In operation, the elliptical SOP with fixed axes ($SOP_{INT}$), obtained as output of the first stage 200, is transformed by the second stage 300 into a fixed linear SOP having the defined (vertical) azimuth. The operation of the second stage 300 of FIG. 3 is controlled by a feed-back control loop based on the one described above. The controller CTRL2 executes a control algorithm similar to the one of the first stage 200, the only difference being that in step 9 the current error is now the absolute value of $V_3$. The aim of the feed-back is to minimize or maximize (depending on the azimuth orientation of the fixed polarizer P2) this error.

It is noted that the use of the Faraday magneto-optic effect in the polarization stabilizer device 100 allows solving the problem of the criticality of the orientation of the applied field and of the optical propagation direction with respect to the internal structure of the material; a problem which is typically present in birefringent element based on electro-optic or acusto-optic effects. In fact, in variable Faraday rotator, the rotation of the polarization azimuth is directly proportional to the component of the variable magnetic field applied along the direction of propagation of the optical radiation. Varying the direction of propagation and/or the direction of the applied magnetic field, the resulting eigenstates (i.e. left and right circularly polarized) do not change.

Figure 4:
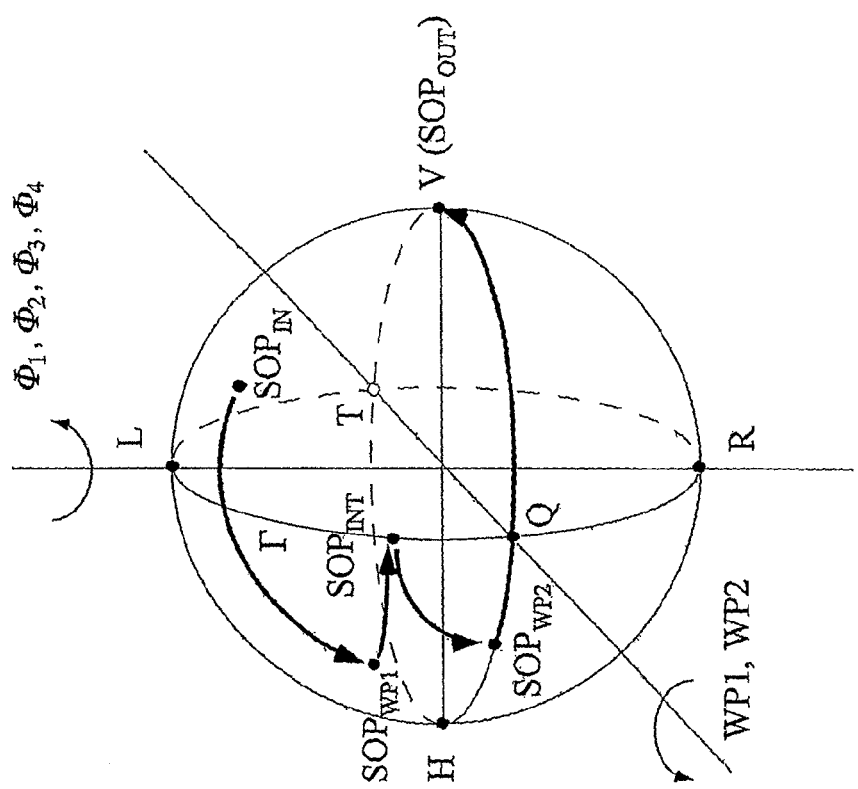
FIG. 4. Poincaré sphere representation of a polarization stabilizer device according to the first embodiment of the present invention.

FIG. 4 is now referred to explain the principles of operation of the proposed polarization stabilizer device 100 of FIG. 3 in terms of a Poincaré sphere representation.

Referring to FIG. 4, each SOP is represented by a point on the sphere, with longitude 2η and latitude 2ξ. The angle η is the azimuth of the major axis of the polarization ellipse and the quantity tan ε is the ellipticity with sign plus or minus according to whether the SOP is left-handed or right-handed. The poles L and R correspond to the left (ξ=45°) and the right (ξ=−45°) circular SOP respectively. The points on the equator represent linearly polarized light with different azimuths η. In particular the points H and V correspond to the horizontal (η=0°) and the vertical (η=90°) linear SOP respectively. The points Q and T correspond to the linear SOP with azimuth η=45° and η=−45° respectively.

The action of a fixed polarizer (such as P2 in FIG. 3) is to transmit only the component of light in a fixed SOP. The transmitted fraction of the incident optical power is $\cos^2(\phi/2)$, where φ is the angle at the center of the sphere between the representative points of incident and transmitted SOP.

For a generic birefringent element there are two orthogonal states of polarization, said eigenstates, which are not changed by the element itself. The effect of the propagation through a birefringent element is represented on the Poincaré sphere by a rotation of an angle Φ about a suitable axis. The diametrically opposite points corresponding to the orthogonal eigenstates belong to and identify this axis of rotation. The angle of rotation Φ is equal to the phase retardation or phase difference introduced by the birefringent elements between the eigenstates. In case of linearly birefringent element, that is an element with linearly polarized eigenstates, it is possible to define two orthogonal eigenaxes respectively as the fixed directions of the linearly polarized optical field corresponding to the eigenstates. A rotator is represented as a birefringent element having its axis of rotation on the vertical axis passing through the poles L and R, as shown in FIG. 4 with the top curved arrow near the symbols $\Phi_1$ and $\Phi_2$ representing the rotation on the sphere corresponding to the rotators VPR1 and VPR2, respectively.

In FIG. 4, an arbitrary input SOP ($SOP_{IN}$) is first transformed into $SOP_{WP1}$ by the quarter-wave plate WP1, having its axis of rotation passing through points T and Q and an associated fixed rotation on the sphere of 90°. Then it is transformed by the second rotator VPR2 into a SOP ($SOP_{INT}$) represented on the Poincaré sphere by a point belonging to the great circle Γ including the points L and Q, that is an elliptical SOP with major axis oriented at ±45° with respect to the (vertical) defined azimuth. Thus, by suitably controlling the phase retardation $\Phi_2$ of the second rotator VPR2 in the exemplary range between 0 and π radians, any input SOP ($SOP_{IN}$) is transformed into a SOP belonging to the great circle Γ. In other words, the first stage 200 locks the polarization state on a meridian of the sphere, i.e. it locks the polarization azimuth to a defined value represented by a couple of values mutually orthogonal. It is contemplated that any great circle on the Poincaré sphere may take the place of the meridian Γ in FIG. 4, being the locus of the SOPs having one of the two polarization parameters (or a combination thereof) fixed. The second stage 300, by controlling the phase retardation $\Phi_4$, moves the SOP from the great circle Γ into the output linear SOP with azimuth η=90°, corresponding to the point V (trajectory $SOP_{INT}$-$SOP_{WP2}$-$SOP_{OUT}$).

For the sake of clarity, in FIG. 4 it is assumed that the first and the third commuted rotators VPR1, VPR3 do not act on the SOP ($\Phi_1$=0 and $\Phi_3$=0).

The endlessness of the control scheme of the first stage 200 will now be illustrated with reference to FIG. 5. To this purpose, it will be assumed that the representative point of the input SOP moves along the exemplary trajectory on the Poincaré sphere shown in FIG. 5a. Four successive representative positions of the input SOP (labeled with incremental numbers from 1 to 4) will be considered.

FIGS. 5b-5e represent the four corresponding SOP evolutions during the propagation of the optical radiation through the first stage 200. The points labeled with the subscripts VPR1, WP1 and VPR2 represent respectively the SOP outputted by the switched rotator VPR1, the SOP outputted by the linear plate WP1 and the SOP transmitted by the smoothly varied rotator VPR2.

Initially (FIG. 5b), the point 1 ($SOP_{IN}$) passes unperturbed the switched retarder VPR1 (phase retardation $\Phi_1$=0). Then it is transformed into the point $1_{WP1}$ by the action of the quarter-wave plate WP1 and subsequently into the point $1_{VPR2}$ (belonging to Γ) by the action of the smoothly varied retarder VPR2 with exemplary phase retardation $\Phi_2$=π/2.

Figure 5A:
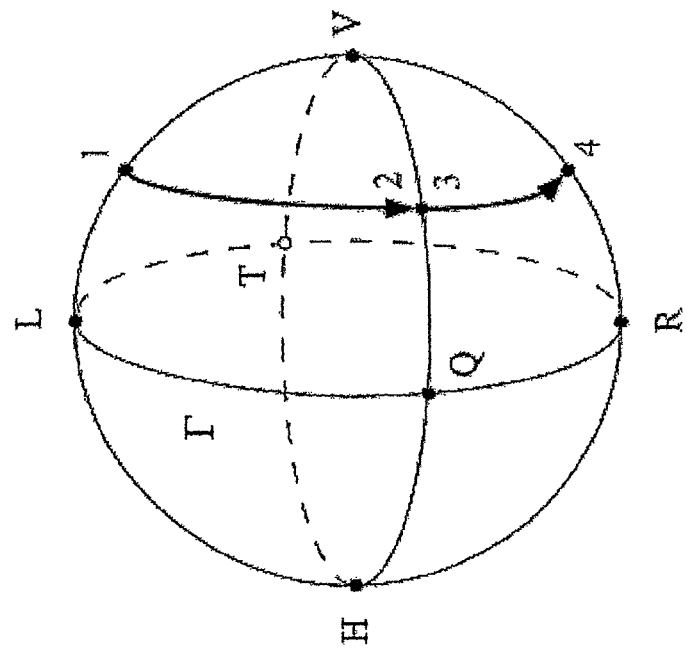
FIG. 5a. Four exemplary points on the Poincaré sphere representing four exemplary input SOPs to the polarization stabilizer of the present invention.
Figure 5C:
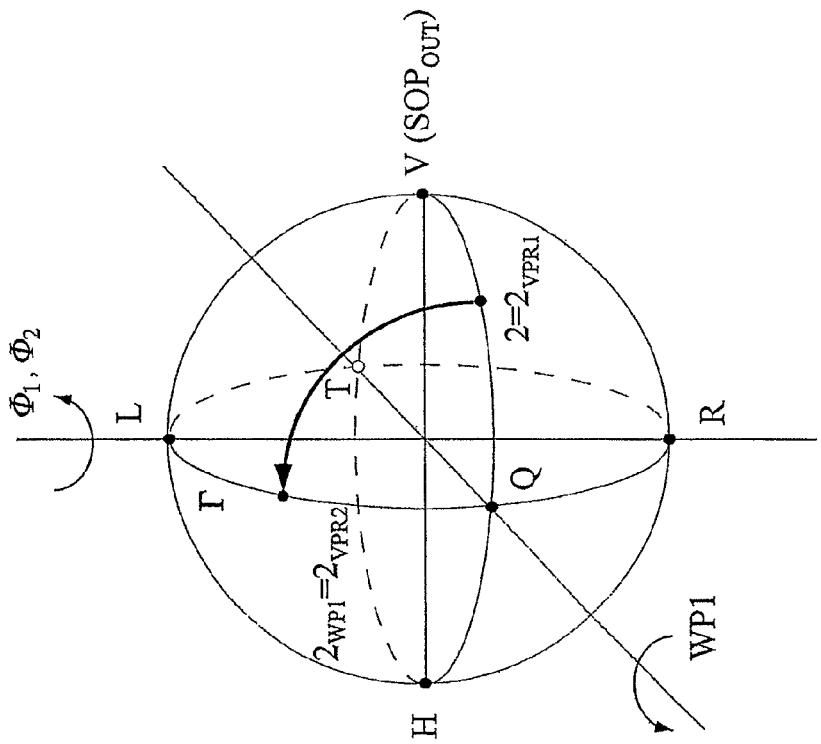
FIGS. 5b-5e. SOP transformations on the Poincaré sphere generated by the first embodiment of the present invention polarization stabilizer corresponding to the four input SOPs of FIG. 5a FIG. 6a-6c. SOP transformations on the Poincaré sphere generated by the first embodiment of the present invention polarization stabilizer.
Figure 5B:
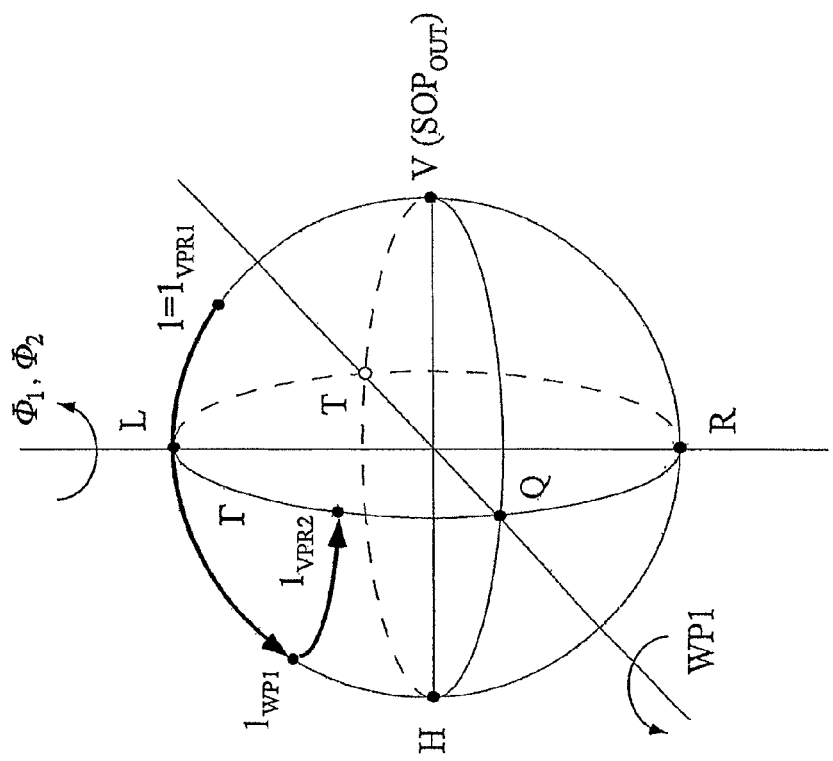

The variation of $SOP_{IN}$ shown in the trajectory from point 1 to point 2 in FIG. 5a, is compensated by progressively decreasing the phase retardation $\Phi_2$ till to zero when the point $SOP_{IN}$ intercepts the great circle including V and Q, i.e. the equator (point 2 in FIG. 5c, $\Phi_1$=0, $\Phi_2$=0). In fact, after the action of WP1, the SOP is already on the great circle Γ.

Figure 5E:
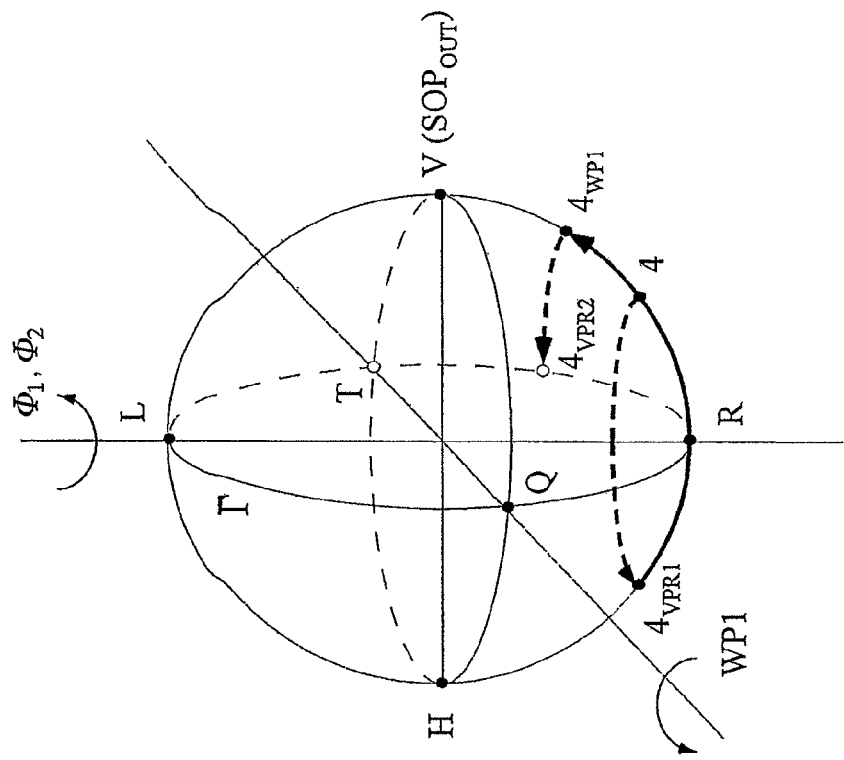
Figure 5D:
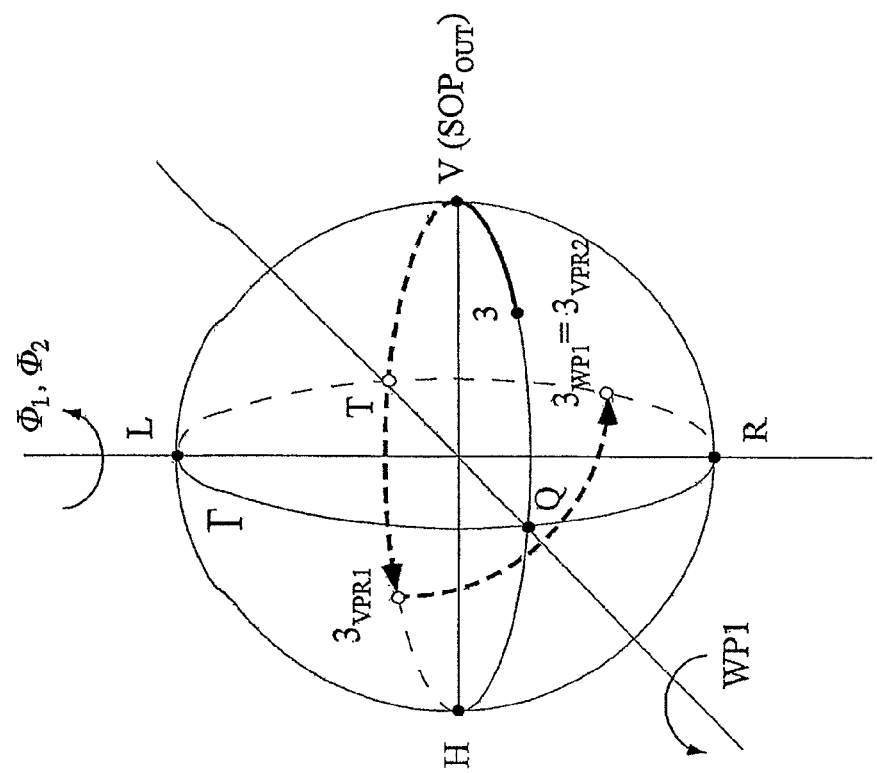

The further variation of $SOP_{IN}$ according to FIG. 5a cannot be compensated simply by decreasing $\Phi_2$ because it has reached its lower limit. Therefore, in order to obtain an endless control, the phase retardation $\Phi_1$ is commuted to π, while $\Phi_2$ is kept constant (i.e. equal to zero). As illustrated in FIG. 5d, the polarization azimuth of the input SOP (point 3) is rotated of π/2 by the first variable rotator VPR1 by means of a rotation of π around the vertical axis (i.e. $\Phi_1$=π, $\Phi_2$=0). Now the successive variation of $SOP_{IN}$ is compensated by increasing $\Phi_2$ (FIG. 5e, $\Phi_1$=π, $\Phi_2$=π/2).

It is important to note that during the commutation of the first phase retardation $\Phi_1$ the SOP moves always on the equator (trajectory $3\text{-}3_{VPR1}$ in FIG. 5d), which is subsequently transformed into the great circle F including L and Q by the quarter-wave plate WP1. During commutation, the subsequent rotator VPR2 is either at 0 or $\pi$, i.e. it transforms the circle $\Gamma$ in itself. In conclusion, during the commutation of VPR1 the SOP transformed by the first stage 200 remains at the target polarization azimuth (module 90°), provided that the input SOP is nearly constant during the commutation.

The endless operation of the control procedure of the second stage 300 of FIG. 3 is now described with reference to FIGS. 6a-6c, under the assumption that the representative point of the incident SOP ($SOP_{INT}$) endlessly moves on the great circle $\Gamma$ in the direction from point Q to point L.

Figure 6C:
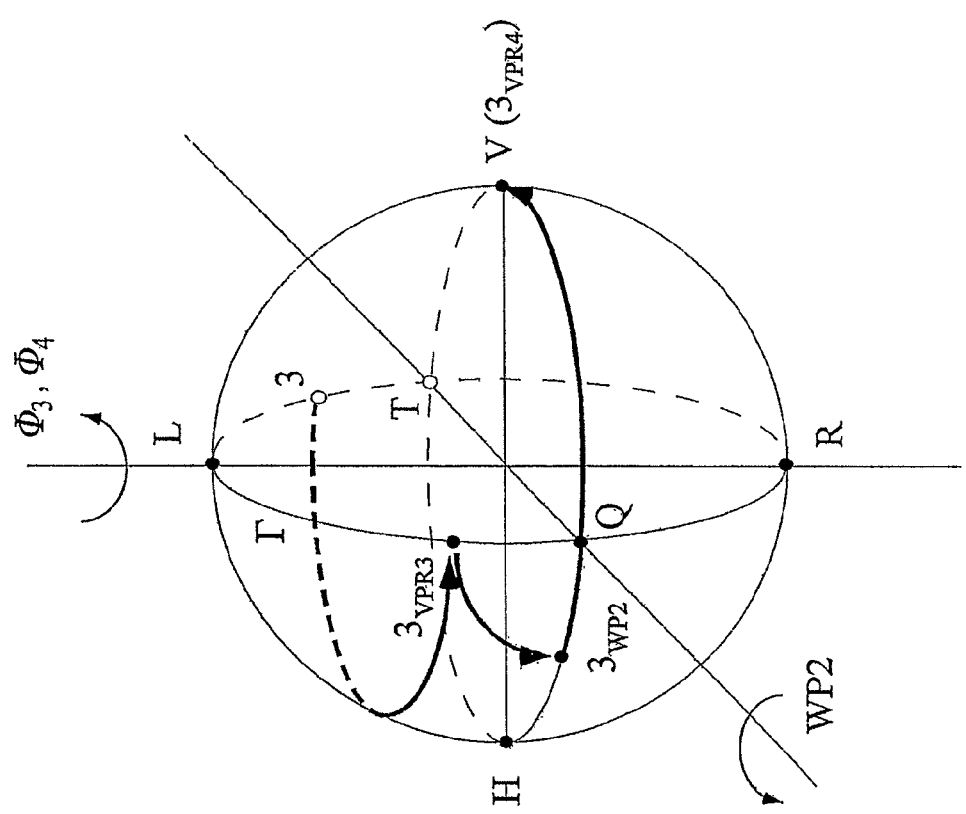

FIGS. 6a-6c represent the corresponding evolution of the SOPs during the propagation through the birefringent elements of the second stage 300 of FIG. 3. The points labeled with the subscripts VPR3, WP2 and VPR4 represent respectively the SOP outputted by the switched rotator VPR3, the linear plate WP2 and the smoothly varied rotator VPR4. In all cases the output SOP is the linear state represented by the point V.

Initially (FIG. 6a) the point 1, representative of the first $SOP_{INT}$, is left unaltered by the third rotator VPR3 ($\Phi_3=0$). Then it is transformed into the point $\mathbf{1}_{WP2}$ by the action of the quarter-wave plate WP2 and subsequently into the point $\mathbf{1}_{VPR4}$ by the action of the smoothly varied rotator with exemplary phase retardation $\Phi_4=3\pi/4$. While the representative point 1 moves along the great circle $\Gamma$, the control algorithm reacts by increasing the phase retardation $\Phi_4$ until reaching the value of $\pi$ when the point $SOP_{INT}$ reaches the north pole L, that is to say is left circularly polarized (FIG. 6b, point 2, $\Phi_3=0$, $\Phi_4=\pi$). The further variation of $SOP_{INT}$ can not be compensated simply by further increasing $\Phi_4$ because it has reached the exemplary upper limit of $\pi$. Therefore, in order to obtain an endless control, the phase retardation $\Phi_3$ is commuted from 0 to $\pi$, while $\Phi_2$ is kept constant, i.e. equal to $\pi$ (after commutation: $\Phi_3=\pi$, $\Phi_4=\pi$). As illustrated in FIG. 6b, since the point 2 ($SOP_{INT}$) is an eigenstate (L) of the variable rotator, it is not perturbed during the switching of the rotator VPR3. This assures that the commutation does not perturb the output power, provided that the $SOP_{INT}$ is nearly constant during the commutation. Now the further variation of $SOP_{INT}$, as illustrated in FIG. 6c, is compensated by decreasing $\Phi_4$ ($\Phi_3=\pi$, $\Phi_4=3\pi/4$).

The proposed endless polarization stabilizer 100 of FIG. 3 for polarization multiplexed system has been experimentally tested. By varying the electrical current injected in the variable rotators VPR1, VPR2, VPR3 and VPR4 in the range of about 9÷27 mA, it has been possible to rotate the polarization azimuth in the range 0°÷90°. The measured response time of the VPRs in switching the polarization azimuth from 0° to 90° and vice versa is about 40 µs. This response time is limited by the electric circuit of the current driver. The control algorithm has been implemented on a single digital signal processing electronic controller (CTRL1, CTRL2). The electrical feedback signals are generated by the photodiodes (PD1, PD2, PD3) with lowpass-bandwidth of about 200 kHz, in order not to eliminate the frequency components around the pilot tone frequency. These spectral components are needed by the controller for stabilizing the SOP of the channel identified by the pilot tone. The signals then go through respective pilot tone demodulator (DM1, DM2, DM3) and are acquired by the controller, after analog-to-digital conversion. Three identical pilot tone demodulators are used in the experimentation, characterized by a 3 dB-bandwidth of about 30 kHz around the center frequency given by the pilot tone frequency $f_{PT}=82$ kHz. It has been experimentally found that the demodulator response time is less than 200 µs. Such a response time is inversely proportional to the 3 dB-bandwidth of the demodulator. The step time of the digital algorithm implemented on the controller has been chosen equal to 200 µs in order to allows each feed-back signal coming to the corresponding pilot tone demodulator to stabilize.

At each step of the digital control algorithm the processor computes the error and generates four control signals. These signals, after digital-to-analog conversion, control respectively the current drivers that generate the VPRs input currents.

The effectiveness of the polarization stabilizer 100 of FIG. 3 in polarization tracking has been first verified by considering a single 10 Gb/s intensity-modulated channel with on-off-keying non-return-to-zero (OOK-NRZ) modulation format. To this data modulation a pilot tone is superimposed as a sinusoidal intensity modulation at the pilot tone frequency $f_{PT}=82$ kHz, with modulation index m. More precisely the pilot tone modulator adds to the signal an intensity modulation directly proportional to $[1+m\sin(2\pi f_{PT}t)]$. The measured pilot tone amplitudes $A_i(t)=1$ to 3, are directly proportional to m.

Figure 7:
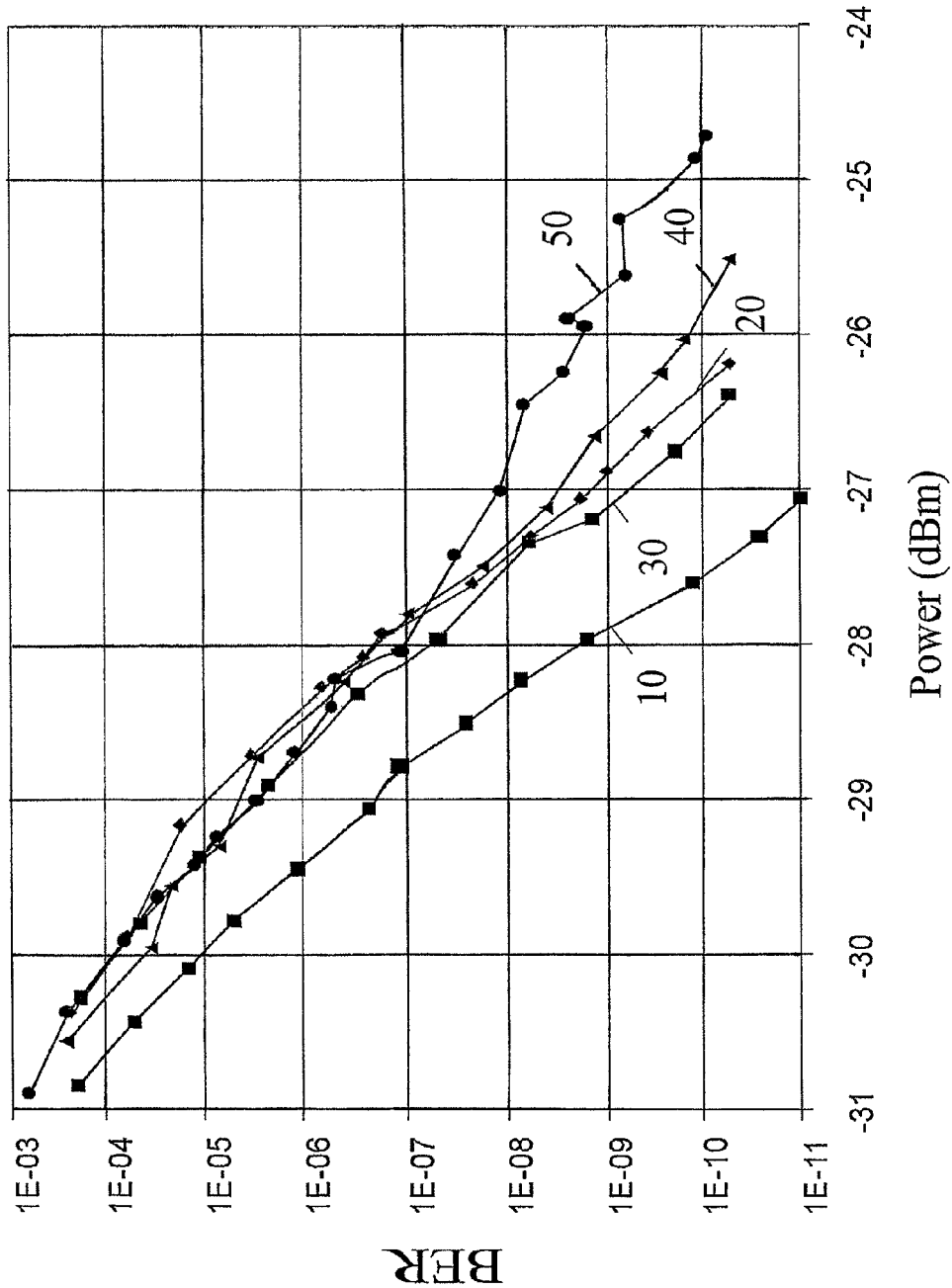
FIG. 7. Diagram of bit error rate (BER) versus power at the receiver of an optical system employing the present invention polarization stabilizer device with different pilot tone modulation index.

In the experimentation the 10 Gb/s intensity-modulated NRZ signal is directly detected by a photoreceiver, with electrical bandwidth of 7.5 GHz, placed after an optical preamplifier. In FIG. 7 the bit-error-rate (BER) as function of the input power (measured in dBm) to the optical preamplifier is shown for various modulation index m. The curves 20, 30, 40, 50 correspond to an automatic polarization tracking driven by a pilot tone with modulation indexes m respectively equal to 0.025, 0.05, 0.075, 0.10, in presence of an endlessly varying SOP inputting the stabilizing device 100. The results are compared with the reference BER curve, labeled 10, obtained in correspondence of a constant input SOP, without polarization tracking and without pilot tone. A penalty, at BER $10^{-9}$, less than 1 dB is measured in case of polarization tracking and pilot tone with m equal to 0.05. The experimented penalties are in good agreement with the usual ones suffered by standard all-optical networks with pilot tones.

The modulation index m should not exceed a threshold value in order not to degrade the transmission quality. It should also not be too low so that the signals $V_1, V_2, V_3$ have a sufficiently high signal to noise ratio (electrical noise may be generated by the photodiode, the demodulator and the controller). From FIG. 7, a good trade-off range is from 0.01 to 0.10, ends of range included.

Figure 8:
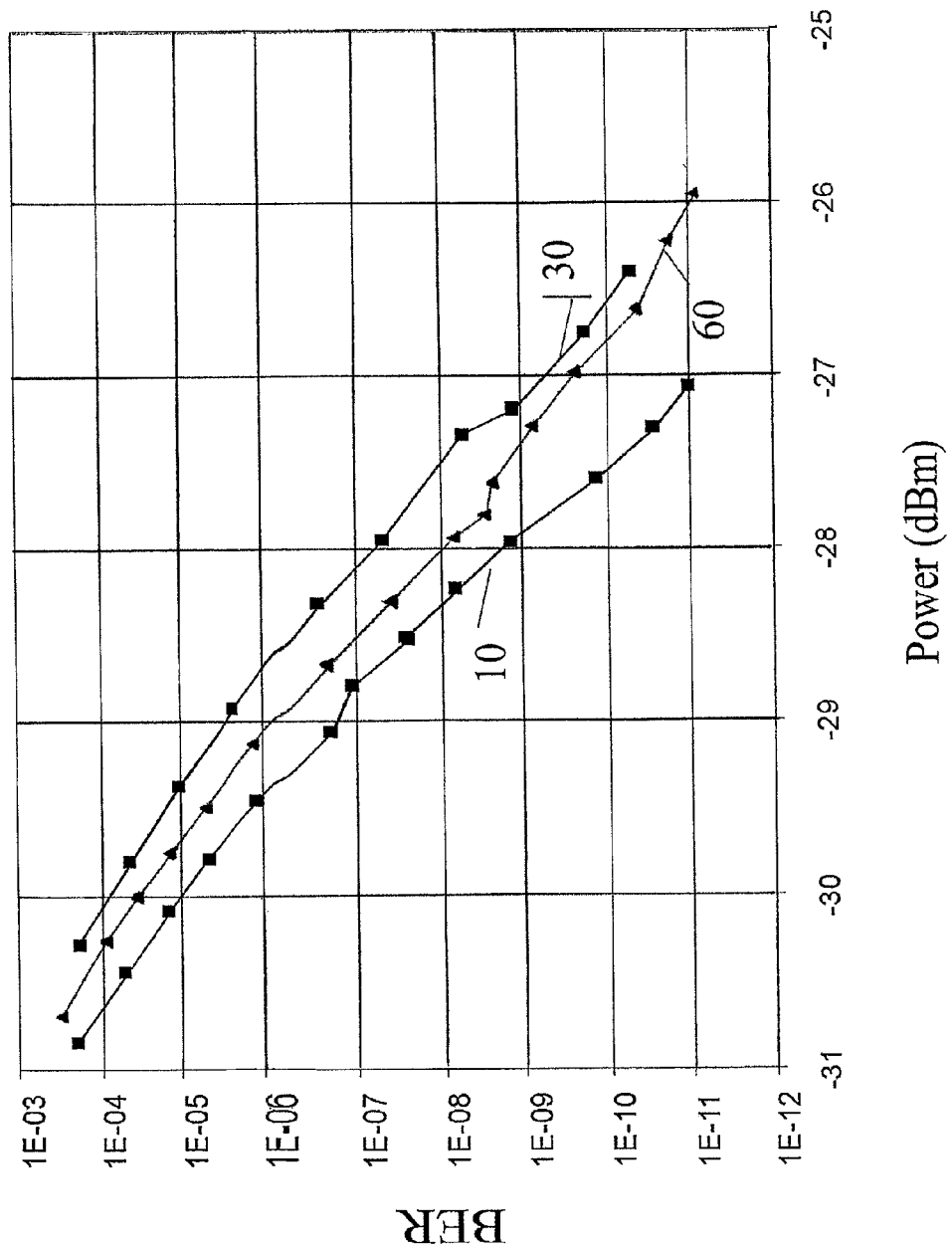
FIG. 8. Diagram of bit error rate (BER) versus power at the receiver of an optical system with and without polarization stabilization according to the present invention.

FIG. 8 shows the result of an assessment of the penalty generated by the pilot tone and by the polarization tracking for m=0.05. The curves 10 and 30 are the same as in FIG. 7. The curve 60 corresponds to a pilot tone with m=0.05, an input SOP constant and no polarization tracking, showing a penalty of about 0.5 dB, at BER $10^{-9}$, with respect to the case of no polarization tracking and no pilot tone (curve 10). The BER curve 30 obtained in correspondence of an endlessly varying SOP and an automatic polarization tracking driven by a pilot tone with m=0.05 shows a penalty of less than 0.5 dB with respect to the curve 60. FIG. 8 shows that for m=0.05 the operation of the polarization tracking gives a very small penalty in addition to the small penalty due to the pilot tone alone.

A second alternative embodiment of the polarization stabilizer of FIG. 2 will now be described with reference to FIG. 9. The same reference numerals will be used for identical elements.

Figure 9:
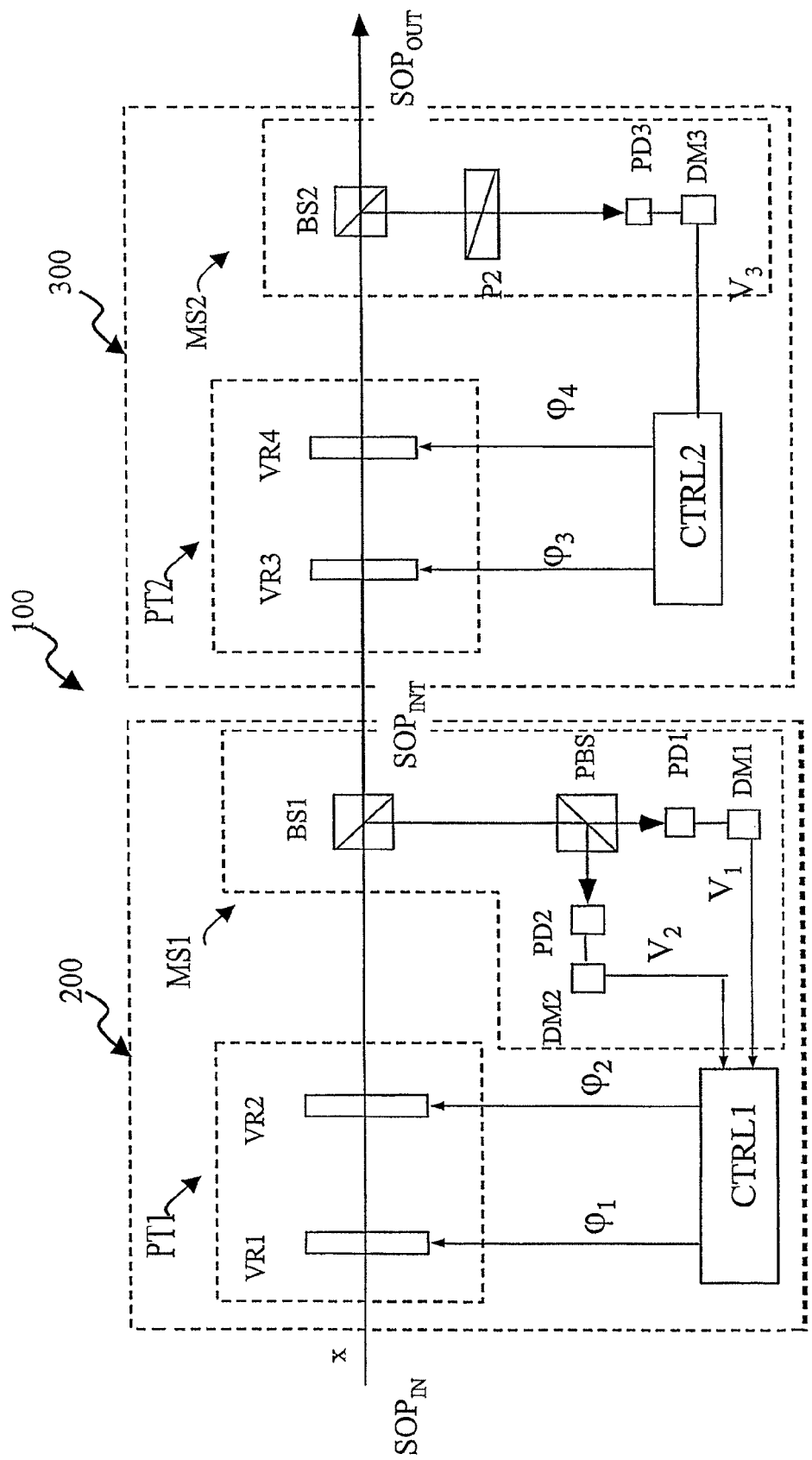
FIG. 9. Schematic drawing of a second exemplary embodiment of the polarization stabilizer device of FIG. 2.

The device 100 of FIG. 9 is apt to receive a polarization multiplexed optical radiation as an input optical radiation having an identified channel comprising a pilot signal with arbitrary state of polarization ($SOP_{IN}$).

The polarization multiplexed optical radiation is emitted from the device 100 as an optical radiation having a stabilized defined SOP of the identified channel ($SOP_{OUT}$). Without loss of generality, the defined SOP is assumed to be the linear vertical SOP having the defined azimuth vertical and the defined ellipticity zero.

The device 100 comprises a first and a second stage 200 and 300.

The polarization multiplexed optical radiation traverses the first stage 200 and outputs the first stage 200 with a SOP of the identified channel ($SOP_{INT}$) having the polarization azimuth parallel or perpendicular with respect to the defined output azimuth (i.e. (0°,90°) having assumed a vertical output azimuth). The optical radiation then traverses the second stage 300.

The first polarization transformer PT1 of the first stage 200 comprises a first and a second variable retarder VR1 and VR2. The second polarization transformer PT2 of the second stage 300 comprises a third and a fourth variable retarder VR3 and VR4. A variable retarder is a birefringent element having fixed birefringence eigenaxes and variable controllable phase retardation. The eigenaxes of the first variable retarder VR1 are oriented at approximately ±45° with respect to the eigenaxes of the second variable retarder VR2. The same is valid for the third and the fourth variable retarders VR3 and VR4. The eigenaxes of the third variable retarder VR3 are oriented approximately parallel (or perpendicular) with respect to the eigenaxes of the second variable retarder VR2, and the eigenaxes of both the variable retarders VR2 and VR3 are parallel (or perpendicular) with respect to the defined output SOP (vertical linear).

The monitoring systems MS1 and MS2 and the controller CTRL1, CTRL2 of the optical device 100 of FIG. 9 have been described above with reference to FIG. 2 (or FIG. 2a) and FIG. 3.

The principle of operation of the optical device 100 of FIG. 9, as well as the control algorithms and the endless mechanism, are similar to those described with reference to FIG. 3. Further details are described in patent application WO03/014811 cited above.

An third alternative embodiment of the polarization stabilizer of FIG. 2 will now be described with reference to FIG. 10.

Figure 10:
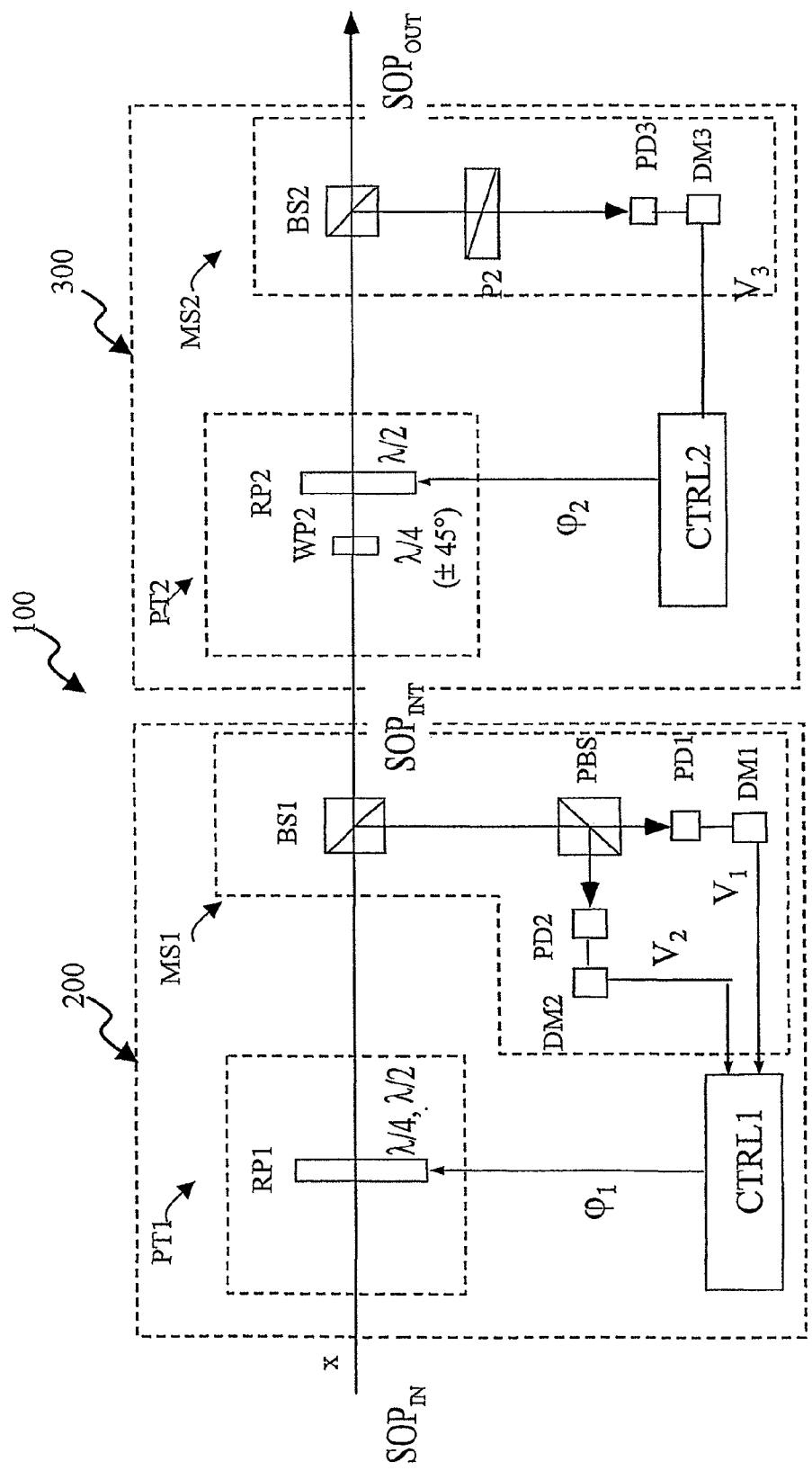
FIG. 10. Schematic drawing of a third exemplary embodiment of the polarization stabilizer device of FIG. 2.

The device 100 of FIG. 10 is apt to receive a polarization multiplexed optical radiation as an input optical radiation having an identified channel comprising a pilot signal with arbitrary state of polarization ($SOP_{IN}$). The polarization multiplexed optical radiation is emitted from the device 100 as an optical radiation having a stabilized defined SOP of the identified channel ($SOP_{OUT}$) and an optical power not depending on the input SOP. Without loss of generality, the defined SOP may be the linear vertical SOP having the defined azimuth vertical and the defined ellipticity zero.

The device 100 comprises a first and a second stage 200 and 300.

The polarization multiplexed optical radiation traverses the first stage 200 and outputs the first stage 200 with a SOP ($SOP_{INT}$) having the polarization azimuth at ±45° with respect to the defined output azimuth (i.e. (−45°, +45°) having assumed a vertical output azimuth).

The first polarization transformer PT1 of the first stage 200 comprises a rotating plate RP1 which may be a quarter-wave plate or a half-wave plate. A rotating plate is a linearly birefringent element having fixed phase retardation and birefringence axes with a controllable rotation.

The second polarization transformer PT2 of the second stage 300 comprises a fixed quarter-wave plate WP2 oriented with its axes at ±45° to the output SOP (vertical) and a rotating half-wave plate RP2.

The monitoring systems MS1 and MS2 and the controller CTRL1, CTRL2 of the optical device 100 of FIG. 10 have been described above with reference to FIGS. 2, 3 and FIG. 2a.

The principle of operation of the optical device 100 of FIG. 10 is based on the one described with reference to FIG. 3, provided that now the endless operation is provided by the infinite rotation of the plates RP1 and RP2, and the control algorithm needs to be suitably adjusted in a straightforward way.

It is noted that the prior art polarization stabilizer devices based on a two stage scheme, such as for example those described in WO03/014811, are not suitable to stabilize the polarization of a polarization multiplexed radiation. In fact, the superposition of two orthogonally polarized optical channels (e.g. having the same optical wavelength) results in an overall SOP which depends on the intensities and the relative phase of the two channels. With reference to the Poincaré sphere representation, in case of equal intensity of the two orthogonally polarized channels, the overall SOP is represented by a point P lying on the great circle equidistant from the two diametrically opposite points representative of the channels. The actual position of this point P on the great circle depends upon the relative phase and it moves on the great circle as the relative phase between the two superposed channels varies in the range from 0° to 360°. Vice versa, the overall SOP represented by a point S might be obtained by superposing two beams with equal intensities and orthogonal SOPs represented by any couple of diametrically opposite points belonging to the great circle defined as the maximum circle of points equidistant from S.

In an attempt to use the prior art schemes to stabilize a polarization multiplexed radiation, the Applicant has understood that those schemes try to stabilize the overall SOP and not the orthogonal SOPs of each channel. In fact, when the overall SOP is stabilized, for example, with reference to FIGS. 3 and 4, in the vertical linear point V, the orthogonal SOPs of the two channels lie on the great circle Γ of FIG. 4 and they move along Γ as their relative phase changes.

The Applicant has also understood that identifying and measuring the identified channel at the output end of solely the second stage would not provide the desired technical effects. In fact, the first stage 200 would lock the overall SOP, with exemplary reference to FIGS. 3 and 4, on the meridian Γ while the two SOPs of the channels would rapidly fluctuate everywhere on the Poincaré sphere. The second stage 300 would not be able to lock the SOP of the identified channel in the point V, as it is designed to transform a generic point on Γ in V and the SOP of the identified channel does not lie on Γ. Having recognized these problems, the Applicant has understood that a suitable design of the stabilizer device 100 of the present invention would have provided the desired performances.

It will be appreciated that the polarization stabilizer device 100 of the present invention provides an output optical radiation having a fixed linear SOP of the identified channel. However, other devices based on this design could provide any other defined SOP that may be desired. For example, circularly polarized SOP, or elliptically polarized SOP, or linearly polarized SOP with a time variant rotation of a desired angular velocity. To generate a fixed elliptical output SOP, instead of a linear output SOP, it is sufficient to produce a fixed linear SOP as described above and then obtain an elliptical SOP with a half-wave plate followed by a quarter-wave plate, both fixed and suitably oriented. Another alternative is to add a rotating half-wave plate to transform a fixed linear SOP into a rotating linear SOP. The polarization stabilizer devices 100 of FIG. 3 can also be modified to obtain any fixed output linear SOP other than vertical linear SOP by suitable rotation of the element WP1 and WP2 (rotation of the eigenaxes azimuth) and the elements PBS and P2. This generalized configuration is obtained from the configuration represented in FIG. 4 by a suitable rotation of the Poincaré sphere about the vertical (L-R) axis.

More in general, any rigid rotation of the Poincaré sphere shown in FIG. 4 results in a respective configuration of the polarization stabilizer device 100 shown in FIG. 3 which is contemplated by the present invention. The same reasoning hold for devices 100 of FIGS. 9 and 10.

The invention claimed is:

1. A method for stabilizing the state of polarization of polarization multiplexed optical radiation, said polarization multiplexed optical radiation comprising an identified channel which is provided with a pilot signal, comprising:
   (a) providing to the polarization multiplexed optical radiation a first controllable polarization transformation to generate a first transformed optical radiation;
   (b) detecting a first state of polarization of a first polarized portion of the identified channel of the first transformed optical radiation with respect to a first polarization parameter of the first transformed optical radiation;
   (c) controlling, responsively to said first state of polarization, the first controllable polarization transformation so that the first polarization parameter of the first transformed optical radiation has a predetermined value independent of a polarization state of the polarization multiplexed optical radiation;
   (d) providing to the first transformed optical radiation a second controllable polarization transformation to generate a second transformed optical radiation;
   (e) detecting a second state of polarization of a second polarized portion of the identified channel of the second transformed optical radiation; and
   (f) controlling, responsively to said second state of polarization, the second controllable polarization transformation so that the second state of polarization has a predefined value.

2. The method according to claim 1, wherein said first polarization parameter includes an ellipticity of the first transformed optical radiation.

3. The method according to claim 1, wherein said second polarized portion of said identified channel of the second transformed optical radiation has a state of polarization parallel or perpendicular to said first state of polarization.

4. The method according to claim 1, wherein step (b) comprises measuring a modulation amplitude of said pilot signal.

5. The method according to claim 4, wherein step (b) comprises extracting a power fraction from the first transformed optical radiation, polarizing said power fraction to generate a polarized power fraction, detecting said polarized power fraction and pass-band filtering said detected polarized power fraction to obtain said modulation amplitude.

6. The method according to claim 1, wherein step (e) comprises measuring modulation amplitude of said pilot signal.

7. The method according to claim 6, wherein step (e) comprises extracting a power fraction from the second transformed optical radiation, polarizing said power fraction to generate a polarized power fraction, detecting said polarized power fraction and pass-band filtering said detected polarized power fraction to obtain said modulation amplitude.

8. The method according to claim 1, further comprising detecting a third state of polarization with respect to the first polarization parameter of a third polarized portion of said identified channel of the first transformed optical radiation.

9. The method according to claim 8, wherein said third polarized portion of said identified channel of the first transformed optical radiation has the first polarization parameter orthogonal to the first polarization parameter of said first polarized portion.

10. The method according to claim 1, wherein the first controllable polarization transformation is endlessly varying.

11. The method according to claim 1, wherein the second controllable polarization transformation is endlessly varying.

12. A method of demultiplexing polarization multiplexed optical radiation, comprising the method of stabilizing the state of polarization of polarization multiplexed optical radiation, wherein said polarization multiplexed optical radiation comprises an identified channel which is provided with a pilot signal, according to claim 1, and further comprising separating the identified channel in the second transformed optical radiation from a further channel orthogonally polarized to the identified channel.

13. A method of transmitting a polarization multiplexed optical signal comprising:
   providing a pilot signal to an optical channel to generate an identified channel; polarization multiplexing the identified channel with a further channel at a first location to generate polarization multiplexed optical radiation; propagating said polarization multiplexed optical radiation at a second location different from the first location; stabilizing the state of polarization of the polarization multiplexed optical radiation at the second location according to the method of claim 1, to generate a polarization stabilized optical radiation; separating the identified channel of the polarization stabilized optical radiation from the further channel; and detecting at least one of said identified and further channel.

14. A device for stabilizing the state of polarization of polarization multiplexed optical radiation, said polarization multiplexed optical radiation comprising an identified channel which is provided with a pilot signal, comprising:
   a first polarization transformer comprising a first birefringent element operable to provide a first variable polarization transformation to the polarization multiplexed optical radiation;
   a first monitoring system responsive to said pilot signal and capable of detecting a first state of polarization of a first polarized portion of the identified channel with respect to a first polarization parameter downstream of the first polarization transformer;
   a controller capable of controlling responsively to the first state of polarization of said first polarized portion, said first variable polarization transformation so as to maintain the first polarization parameter of the identified channel downstream of the first polarization transformer at a predefined value independent of a polarization state of the polarization multiplexed optical radiation;
   a second polarization transformer positioned downstream of the first polarization transformer and comprising a second birefringent element operable to provide a second variable polarization transformation to the polarization multiplexed optical radiation; and
   a second monitoring system responsive to said pilot signal and capable of detecting a second state of polarization of a second polarized portion of the identified channel downstream of the second polarization transformer, the controller being further capable of controlling, responsively to the second state of polarization of said second polarized portion, said second variable polarization transformation so as to maintain the second state of polarization at a predefined value.

15. The polarization stabilizing device according to claim 14, wherein the first monitoring system is further capable of detecting a third state of polarization with respect to the first polarization parameter of a further polarized portion of the identified channel downstream of the first polarization transformer, wherein said further polarized portion is orthogonal to the first polarized portion.

16. The polarization stabilizing device according to claim 14, wherein the first polarization transformer further comprises a third birefringent element operable to provide a third variable polarization transformation to the polarization multiplexed optical radiation.

17. The polarization stabilizing device according to claim 16, wherein the controller is configured to switch the third variable polarization transformation between first and second values when the first variable polarization transformation reaches a predefined threshold value.

18. The polarization stabilizing device according to claim 16, wherein each of the first birefringent element and the third birefringent element comprises a respective variable rotator and the first polarization transformer further comprises a quarter-wave plate optically interposed between the first and the third birefringent element.

19. The polarization stabilizing device according to claim 16, wherein the second polarization transformer further comprises a fourth birefringent element operable to provide a fourth variable polarization transformation to the polarization multiplexed optical radiation.

20. The polarization stabilizing device according to 19, wherein the controller is configured to switch the fourth variable polarization transformation between third and fourth values when the second variable polarization transformation reaches a predefined threshold value.

21. The polarization stabilizing device according to claim 14, wherein the first monitoring system is configured to measure a modulation amplitude of said pilot signal so as to measure said optical power of said first polarized portion.

22. The polarization stabilizing device according to claim 21, wherein the first monitoring system comprises a splitter for extracting a power portion of said polarization multiplexed optical radiation, a polarization splitter for extracting a polarized portion of said power portion, a photodiode for generating a signal from said polarized portion of said power portion and a demodulator for band-pass filtering said signal to obtain said modulation amplitude of said pilot signal.

23. An optical polarization demultiplexer comprising the polarization stabilizing device of claim 14, and a polarization division demultiplexer located downstream the polarization stabilizing device and oriented parallel or perpendicular to said defined state of polarization.

24. A polarization division multiplexing system comprising: a polarization transmitter capable of combining a first and a second optical channel having orthogonal polarization, wherein the first channel comprises a pilot signal; a transmission line capable of transmitting said combined first and second optical channel; and an optical polarization demultiplexer according to claim 23, optically coupled to said transmission line and capable of separating said first and second optical channel.

* * * * *